US010103666B1

(12) United States Patent
Fan et al.

(10) Patent No.: US 10,103,666 B1
(45) Date of Patent: Oct. 16, 2018

(54) SYNCHRONOUS GENERATOR MODELING AND FREQUENCY CONTROL USING UNSCENTED KALMAN FILTER

(71) Applicants: Lingling Fan, Tampa, FL (US); Zhixin Miao, Tampa, FL (US); Hossein Ghassempour Aghamolki, Tampa, FL (US)

(72) Inventors: Lingling Fan, Tampa, FL (US); Zhixin Miao, Tampa, FL (US); Hossein Ghassempour Aghamolki, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 6 days.

(21) Appl. No.: 15/364,950

(22) Filed: Nov. 30, 2016

Related U.S. Application Data

(60) Provisional application No. 62/260,840, filed on Nov. 30, 2015.

(51) Int. Cl.
*H02P 9/42* (2006.01)
(52) U.S. Cl.
CPC ..................... *H02P 9/42* (2013.01)
(58) Field of Classification Search
CPC ........ H02P 9/42; G06F 17/5009; H04B 15/00
(Continued)

(56) References Cited

U.S. PATENT DOCUMENTS

2005/0137834 A1* 6/2005 Heydt et al. ........ G06F 17/5009
703/2
2014/0306534 A1 10/2014 Shi et al.
(Continued)

FOREIGN PATENT DOCUMENTS

CN   101291061   4/2010
CN   103036498   4/2013

OTHER PUBLICATIONS

Zhou et al., Dynamic State Estimation of a Synchronous Machine Using PMU Data: A Comparative Study, IEEE Transactions on Smart Grid, vol. 6, No. 1, Jan. 2015.
(Continued)

*Primary Examiner* — Albert K Wong
(74) *Attorney, Agent, or Firm* — Thomas | Horstemeyer, LLP

(57) ABSTRACT

Various examples are related to synchronous generator modeling with frequency control, which can be achieved using unscented Kalman filtering. In one example, a method includes obtaining operational parameters associated with a generator of a power system; determining parameters of a synchronous generator model with frequency control based at least in part upon the operational parameters associated with the generator; and providing a command to a frequency control of the generator, the command updating one or more parameters of the frequency control. In another example, a system includes a generator controller for a generator of a power system; and a computing device in communication with the generator controller, where the computing device is configured to determine parameters of the synchronous generator model using operational parameters associated with the generator and provide a command updating one or more parameters of a frequency control of the generator controller.

18 Claims, 19 Drawing Sheets

(58) Field of Classification Search
USPC .......................................................... 703/2
See application file for complete search history.

(56) References Cited

U.S. PATENT DOCUMENTS

2015/0100282 A1    4/2015  Shokooh et al.
2017/0324319 A1*  11/2017  Mok ................... H02M 1/4208

OTHER PUBLICATIONS

Huang et al., Generator Dynamic Model Validation and Parameter Calibration Using Phasor Measurements at the Point of Connection, IEEE Transactions on Power Systems, vol. 28, No. 2, May 2013.

Ghahremani et al., Online State Estimation of a Synchronous Generator Using Unscented Kalman Filter From Phasor Measurements Units, IEEE Transactions on Energy Conversion, vol. 26, No. 4, Dec. 2011.

Ghahremani et al., Dynamic State Estimation in Power System by Applying the Extended Kalman Filter With Unknown Inputs to Phasor Measurements, IEEE Transactions on Power Systems, vol. 26, No. 4, Nov. 2011.

Fan et al., Extended Kalman filtering based real-time dynamic state and parameter estimation using PMU data, Electric Power Systems Research vol. 103, Oct. 2013, pp. 168-177.

Särkkä, Simo, On Unscented Kalman Filtering for State Estimation of Continuous-Time Nonlinear Systems, Preprint—To Appear in IEEE Transactions on Automatic Control, Oct. 2007.

Wehbe, Yasser, Model Estimation of Electric Power Systems by Phasor Measurement Units Data, 2012, Graduate Theses and Dissertations. http://scholarcommons.usf.edu/etd/4419.

Li, Xiao, Robust Decentralized State Estimation and Tracking for Power Systems via Network Gossiping, IEEE Journal on Selected Areas in Communications (vol. 31, Issue: 7, Jul. 2013).

Ariff, M.A.M., Estimating Dynamic Model Parameters for Adaptive Protection and Control in Power System, IEEE Transactions on Power Systems, vol. 30, No. 2, Mar. 2015.

* cited by examiner

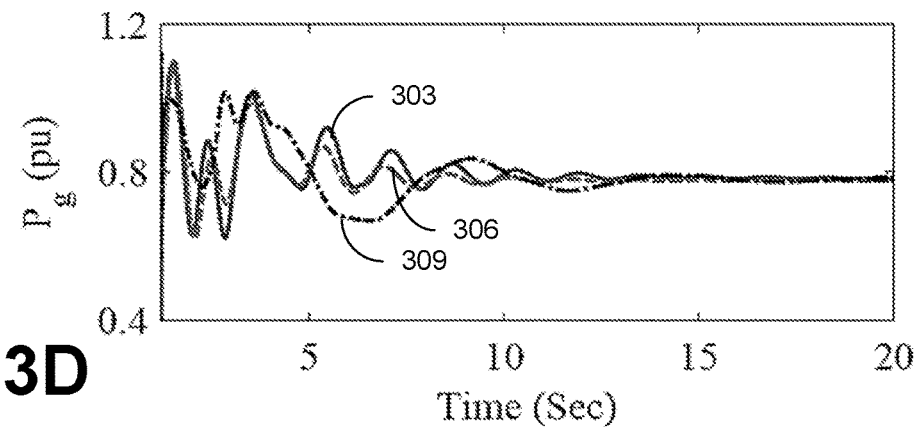
FIG. 3D
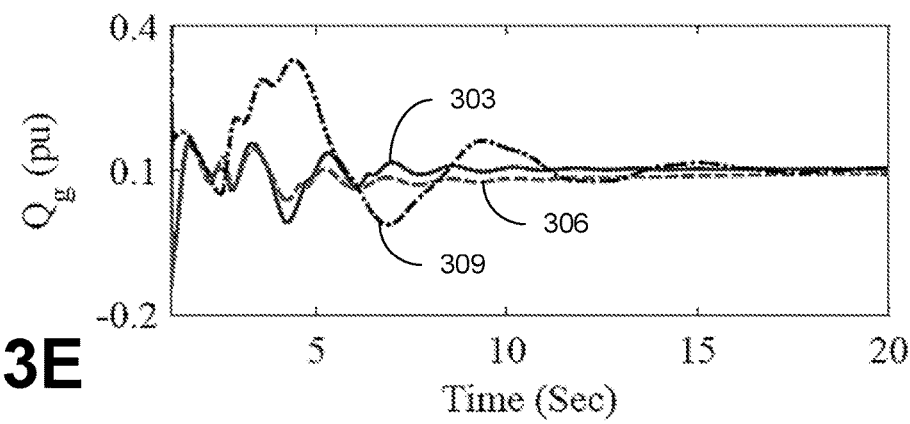
FIG. 3E
Initial values for Three Parameters Estimation for a generator with Primary frequency control
| $X_0$ | All Sets | $P_0$ | Set 1 | Set 2 | Set 3 | $Q$ | All Sets |
|---|---|---|---|---|---|---|---|
| $\delta$ | 0 | $P_{11}$ | 0.1 | 0.1 | 0.1 | $Q_{11}$ | $10^{-5}$ |
| $\omega$ | 1 | $P_{22}$ | $10^{-5}$ | $1e^{-5}$ | $10^{-5}$ | $Q_{22}$ | $10^{-11}$ |
| $P_m$ | 0.8 | $P_{33}$ | 0.1 | 0.1 | 0.1 | $Q_{33}$ | $10^{-9}$ |
| $P_c$ | 0 | $P_{44}$ | $10^{-5}$ | $1e^{-5}$ | $1e^{-5}$ | $Q_{44}$ | $10^{-9}$ |
| $G$ | 1 | $P_{55}$ | $10^{-4}$ | $1e^{-4}$ | 80 | $Q_{55}$ | $10^{-4}$ |
| $J$ | 10 | $P_{66}$ | 240 | 35 | 76 | $Q_{66}$ | $10^{-12}$ |
| $N$ | 1 | $P_{77}$ | 6.3 | 3.4 | 10 | $Q_{77}$ | $10^{-6}$ |
| $K_i$ | 10 | $P_{88}$ | 77 | 64 | 20 | $Q_{88}$ | $10^{-4}$ |
FIG. 5

Generator parameters in Simpower simulations

| Parameters | Set 1 | Set 2 | Set 3 |
|---|---|---|---|
| $E_q$ (pu) | 1.0567 | 1.8537 | 1.8537 |
| $x'_d$ (pu) | 0.3 | 0.3 | 0.3 |
| $x''_d$ (pu) | — | 0.25 | 0.25 |
| $x'_q$ (pu) | — | 0.55 | 0.55 |
| $x''_q$ (pu) | — | 0.25 | 0.25 |
| $T'_{do}$ (pu) | — | 8 | 8 |
| $T''_{do}$ (pu) | — | 0.03 | 0.03 |
| $T'_{qo}$ (pu) | — | 0.4 | 0.4 |
| $T''_{qo}$ (pu) | — | 0.05 | 0.05 |
| $P_{ref}$ (pu) | 0.778 | 0.779 | 0.779 |
| $H$ (pu. sec.) | 6.5 | 6.5 | 6.5 |
| $R$ (pu) | 0.1 | 0.1 | 0.1 |
| $T_r$ (sec.) | 0.1 | 0.1 | 0.1 |
| $K_i$ | 50 | 50 | 50 |
| AVR Gain($K_a$) | — | — | 200 |
| AVR $T_a$ | — | — | 0.001 |
| Exciter $K_e$ | — | — | 1 |
| Exciter $T_e$ | — | — | 0 |
| PSS $K_p$ | — | — | 30 |
| PSS $T_w$ | — | — | 10 |
| PSS lead lag 1 $T_{num}$ | — | — | 0.05 |
| PSS lead lag 1 $T_{den}$ | — | — | 0.02 |
| PSS lead lag 2 $T_{num}$ | — | — | 3 |
| PSS lead lag 2 $T_{den}$ | — | — | 5.4 |

FIG. 4

Effect of measurement noise on parameters estimation

| scenarios | H | | Droop | | $T_r$ | | $K_i$ | |
|---|---|---|---|---|---|---|---|---|
| | Estimated | Error (%) | Estimated | Error (%) | Estimated | Error (%) | Estimated | Error (%) |
| Simulation | 6.5 | | 0.2 | | 0.1 | | 50 | |
| 0% error | 6.4773 | 0.35 | 0.1992 | 0.40 | 0.1005 | 0.52 | 50.0127 | 0.02 |
| 1% error | 6.4763 | 0.37 | 0.1992 | 0.40 | 0.1007 | 0.67 | 50.0391 | 0.08 |
| 2% error | 6.4411 | 0.91 | 0.1989 | 0.56 | 0.0990 | 1.00 | 49.8697 | 0.26 |
| 5% error | 6.8068 | 4.72 | 0.1948 | 2.61 | 0.1059 | 5.93 | 50.4820 | 0.97 |

FIG. 8

Initial state variables and covariance matrices for real-world PMU Data

| $X_0$ | values | $P_0$ | values | $Q$ | values |
|---|---|---|---|---|---|
| $\delta$ | 0 | $P_{1,1}$ | 0.1 | $Q_{1,1}$ | $1e^{-5}$ |
| $\omega$ | 1 | $P_{2,2}$ | 0.1 | $Q_{2,2}$ | $1e^{-9}$ |
| $P_m$ | 0.8 | $P_{3,3}$ | $1e^{-4}$ | $Q_{3,3}$ | $1e^{-9}$ |
| $P_e$ | 0.8 | $P_{4,4}$ | $1e^{-2}$ | $Q_{4,4}$ | $1e^{-9}$ |
| $G$ | 15 | $P_{5,5}$ | 0.1 | $Q_{5,5}$ | $1e^{-8}$ |
| $J$ | 50 | $P_{6,6}$ | 1000 | $Q_{6,6}$ | $1e^{-5}$ |
| $N$ | 20 | $P_{7,7}$ | 0.1 | $Q_{7,7}$ | $1e^{-6}$ |
| $k_i$ | 10 | $P_{8,8}$ | 0.71 | $Q_{8,8}$ | $1e^{-12}$ |
| $D$ | 0 | $P_{9,9}$ | $1e^{-4}$ | $Q_{9,9}$ | $1e^{-8}$ |
| $x'_d$ | 0.1 | $P_{10,10}$ | $1e^{-3}$ | $Q_{10,10}$ | $1e^{-7}$ |
| $E_q$ | 0.9 | $P_{11,11}$ | $1e^{-4}$ | $Q_{11,11}$ | $1e^{-12}$ |

FIG. 11

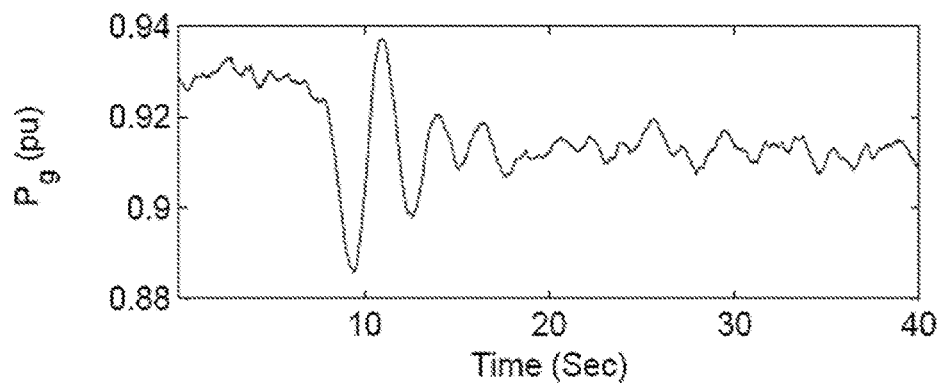
FIG. 12D
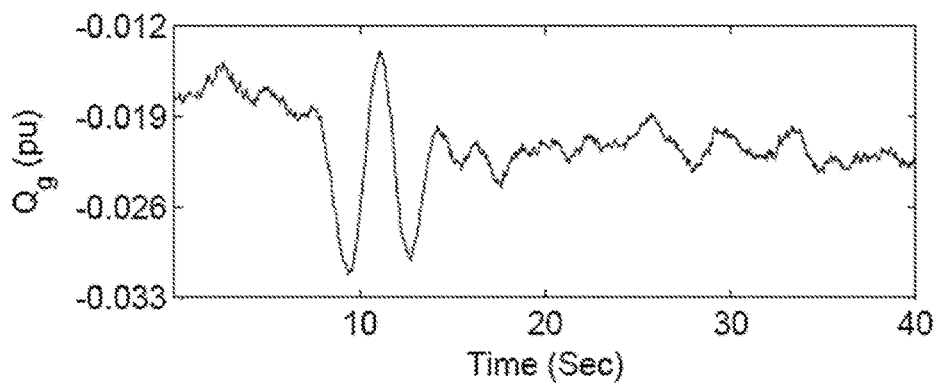
FIG. 12E
| Parameters Estimation for Real-world PMU Data | | | | | | |
|---|---|---|---|---|---|---|
| $H$ | $R$ | $T_r$ | $K_i$ | $D$ | $x'_d$ | $E_q$ |
| 20.18 | 0.0176 | 0.073 | 1.3448 | 0.031 | 0.1947 | 1.0538 |
FIG. 13

SYNCHRONOUS GENERATOR MODELING AND FREQUENCY CONTROL USING UNSCENTED KALMAN FILTER

CROSS REFERENCE TO RELATED APPLICATIONS

This application claims priority to, and the benefit of, U.S. provisional application entitled "Identification of Synchronous Generator Model with Frequency Control Using Unscented Kalman Filter" having Ser. No. 62/260,840, filed Nov. 30, 2015, which is hereby incorporated by reference in its entirety.

STATEMENT REGARDING FEDERALLY SPONSORED RESEARCH OR DEVELOPMENT

This invention was made with government support under Grant Number DE-OE0000369 awarded by the Department of Energy. The Government has certain rights in the invention.

BACKGROUND

Supervisory Control and Data Acquisition (SCADA) systems make use of nonsynchronous data with low density sampling rates to monitor power systems. However, the measurements collected from SCADA do not capture the system dynamics. Phasor measurement units (PMUs) equipped with GPS antennas can be used to provide voltage and current phasors as well as frequency with a high density sampling rate up to 60 Hz. The PMU data can capture the system electromechanical dynamics.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A through 3E illustrate examples of phasor measurement unit (PMU) data sets used to test the identification of a synchronous generator model with frequency control using unscented Kalman filter (UKF) in accordance with various embodiments of the present disclosure.

FIG. 4 includes a table illustrating examples of generator parameters in accordance with various embodiments of the present disclosure.

FIG. 5 includes a table illustrating examples of initial parameter estimations for the synchronous generator model with frequency control in accordance with various embodiments of the present disclosure.

FIG. 8 includes a table illustrating the effect of measurement noise on parameter estimation in accordance with various embodiments of the present disclosure.

FIG. 11 includes a table illustrating examples of initial estimations for measured data in accordance with various embodiments of the present disclosure.

FIGS. 12A through 12E illustrate examples of measured data obtained over a period of 40 seconds by a PMU installed at a 500 kV substation in accordance with various embodiments of the present disclosure.

FIG. 13 includes a table illustrating examples of estimated parameters for the measured data in accordance with various embodiments of the present disclosure.

DETAILED DESCRIPTION

Figure 1:
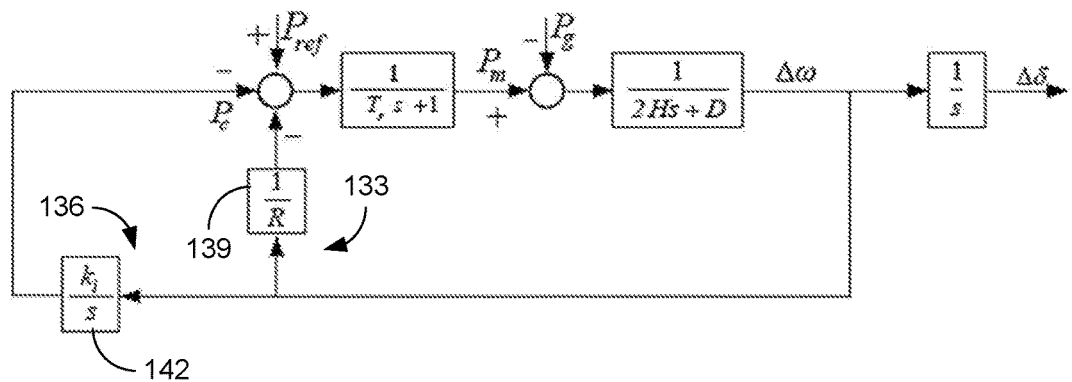
FIG. 1 is a schematic diagram illustrating an example of a synchronous generator model including primary and secondary frequency controls in accordance with various embodiments of the present disclosure.

Disclosed herein are various embodiments related to synchronous generator modeling. Identification of a synchronous generator model with frequency control can be achieved using unscented Kalman filtering. Phasor measurement unit (PMU) data can be used for synchronous generator parameter estimation. Reference will now be made in detail to the description of the embodiments as illustrated in the drawings, wherein like reference numbers indicate like parts throughout the several views.

Synchronous generator parameter estimation has been investigated in the literature. Based on the scope of estimation, some investigated the electrical state estimation (e.g. rotor angle and rotor speed), while others estimated both system states and generator parameters. Based on estimation methods, at least two major systematic methods for parameter estimation have been considered: least squares estimation (LSE) and Kalman filter-based estimation. To use LSE for dynamic system parameter estimation, a window of data is required. On the other hand, Kalman filter-based estimation can carry out estimation procedures at each time step. Thus Kalman filter-based estimation can be used for online estimation. This is one of the reasons why PMU data-based system identification utilizes Kalman filter-based estimation.

Kalman Filtering was originally proposed for the linear systems. For nonlinear systems, two approaches to handle nonlinearity can be used: extended Kalman filter (EKF) and unscented Kalman filter (UKF). In EKF, nonlinear systems are approximated by linear systems using linearization techniques. EKF was first applied in dynamic model identification using PMU data. For example, parameter calibration for a simple generator dynamic model, parameter calibration for a multi-machine power system under varying fault locations, parameter errors and measurement noises, and parameter calibration for a more complicated generator model which includes electromechanical dynamics, electromagnetic dynamics, exciter dynamics, voltage control blocks and power system stabilizer (PSS), have been considered. EKF-based simple generator model estimation was also carried out in "Extended kalman filtering based real-time dynamic state and parameter estimation using pmu data" by L. Fan and Y. Wehbe (Electric Power Systems Research, 103 (2013) 168-177) and "Dynamic state estimation in power system by applying the extended kalman filter with unknown inputs to phasor measurements" by E. Ghahremani and I. Kamwa (*IEEE Transactions on Power Systems*, 26 (4) (2011) 2556-2566), both of which are hereby incorporated by reference in their entireties. Limitations of EKF method have also been investigated.

In UKF, a nonlinear system model will not be linearized. The stochastic characteristic of a random variable is approximated by a set of sigma points. This technique is essentially a Monto-Carlo simulation technique. The dynamic process of these sigma points can be computed based on the nonlinear estimation model. Statistic characteristics of the dynamic process can then be evaluated. UKF can overcome the limitation of the linearization process used by the EKF method. However, more computing effort may be required due to the introduction of sigma points. The UKF can be applied for state estimation. The accuracy and convergence for both EKF and UKF have been compared in "Online state estimation of a synchronous generator using unscented kalman filter from phasor measurements units" by E. Ghahremani and I. Kamwa (*IEEE Transactions on Power Systems*, 26 (4) (2011) 2556-2566), which focused on state estimation without discussing parameter estimation. UKF has been applied to estimate the following parameters $E_q$, $x'_d$ and H along with states.

The synchronous generator model identified above focuses on the generator electromechanical, electromagnetic and excitation system only. For example, a 4th order transient generator estimation model can be assumed; and a subtransient generator estimation model can be adopted. None has addressed frequency control system identification. The disclosure applies UKF for parameter and state estimation for a synchronous generator model comprising electromechanical dynamics and frequency control.

Not only electromechanical dynamics related to the states and parameters, but also turbine-governor dynamics, primary and secondary frequency control parameters can be estimated. Estimation related to the frequency control based on PMU data has not been studied in the literature. In particular, the following parameters and states can be estimated: inertia constant H, damping factor D, internal voltage $E_q$, transient reactance $x'_d$, mechanical power input $P_m$, droop regulation R, turbine-governor time constant $T_r$, and secondary frequency control integrator gain $K_i$. While some parameters may be difficult to estimate due to nonlinearity, parameter conversion can be adopted to make the estimation easier.

An event playback method can be used to validate the identified low-order model. For validation, the estimated parameters can be used to create a dynamic simulation model. Then event playback can be used to inject the same inputs to the dynamic simulation model. The output signals from the simulation will be compared with the PMU measurements. Finally, real-world PMU data-based identification was used to demonstrate the effectiveness of the disclosed estimation model.

Basic Algorithm of UKF

A continuous nonlinear dynamic system can be represented by the following equations:

$$\begin{cases} \dot{x}(t) = \bar{f}[x(t), u(t), v(t)] \\ y(t) = h[x(t), u(t), v(t)] + w(t) \end{cases} \quad (1)$$

where x(t) is the vector of state variables, y(t) is the vector of output variables, v(t) is the vector of input variables, v(t) is the non-additive process noise, and ω(t) is additive measurement noise. Considering the time step of Δt, EQN. (1) can be written in the discrete time domain as:

$$\begin{cases} x_k = x_{k-1} + \bar{f}[x_{k-1}, u_{k-1}, v_{k-1}]\Delta t \\ \quad = f[x_{k-1}, u_{k-1}, v_{k-1}] \\ y_k = h[x_k, u_k, v_k] + w_k \end{cases} \quad (2)$$

The state $x_k$ can be considered a random variable vector with an estimated mean value of $\hat{x}_k$ and an estimated co-variance of $P_{x_k}$. The vector $\psi_k$ can be considered to be a set of unknown model parameters. For simplification, $\psi_k$ can also be treated as states where $\psi_{k+1} = \psi_k$. Then, the new state vector is $X_k = [x_k^T \; \psi_k^T]^T$. The state-space model in EQN. (2) can be reformulated as:

$$\begin{cases} X_k = f[X_{k-1}, u_{k-1}, v_{k-1}] \\ y_k = h[X_k, u_k, v_k] + w_k \end{cases} \quad (3)$$

Kalman filtering is a recursive estimation algorithm. At each time step, given the previous step's information, such as the mean of the state $\hat{X}_{k-1}$, the covariance of the state $P_{X_{k-1}}$, the Kalman filter estimation will provide the statistic information of the current step, i.e., the mean of the state $\hat{X}_k$ and the covariance of the state $P_{X_k}$. Usually a prediction step estimates the information based on the dynamic model only, and a correction step corrects the information based on the current step's measurements. There are several references for UKF algorithm including, for example, UKF algorithm related equations are disclosed in *Kalman filtering and neural networks* by S. Haykin (Wiley Online Library, 2001), which is hereby incorporated by reference in its entirety.

Unscented Kalman filter (UKF) is a Monte-Carlo simulation method. A set of sigma points can be generated based on the given statistic information: mean and covariance of the states. Sigma points vectors will emulate the distribution of the random variable. The set of sigma points can be denoted by $\chi^i$ and their mean value represented by $\hat{X}$ while their covariance represented by $P_X$. For n number of state variables, a set of 2n+1 points can be generated based on the columns of the matrix $\sqrt{(n+\lambda)P_X}$. At k−1 step, 2n+1 sigma points (vectors) are generated as shown by:

$$\begin{cases} \chi_{k-1}^0 = \hat{X}_{k-1} \\ \chi_{k-1}^i = \hat{X}_{k-1} + \left[\sqrt{(n+\lambda)P_{X_{k-1}}}\right]_i, i = 1, \ldots, n \\ \chi_{k-1}^{i+n} = \hat{X}_{k-1} - \left[\sqrt{(n+\lambda)P_{X_{k-1}}}\right]_{i+n}, i = 1, \ldots, n \end{cases} \quad (4)$$

where λ is a scaling parameter ($\lambda=\alpha^2(n+\kappa)-n$), with α and κ being positive constants. In the prediction step, prediction of the next step state will be carried out for all the sigma points. Based on the information of the sigma points of the next step, the mean and the covariance of the states can be computed. The UKF can use weights to calculate the predicted mean and covariance. The associated weights can be given as follows:

$$\begin{cases} W_{m_0} = \dfrac{\lambda}{(n+\lambda)} \\ W_{c_0} = \dfrac{\lambda}{(n+\lambda)} + (1-\alpha^2+\beta) \\ W_{m_i} = \dfrac{1}{2(n+\lambda)}, i=1,\ldots,2n \\ W_{c_i} = \dfrac{1}{2(n+\lambda)}, i=1,\ldots,2n \end{cases} \quad (5)$$

where β is a positive constant, $W_{m_i}$ is used to compute the mean value, and $W_{c_i}$ is used to compute the covariance matrix. The Kalman Filter parameters (α, κ and β) can be used to tune the filter. Scaling parameter β can be used to incorporate prior knowledge of the distribution of x(k) and for a Gaussian distribution, β=2 is optimal. The scaling parameter α is a positive value used for an arbitrary small number to a minimum of higher order effects. To choose α, two laws are take into account. First, for all choices of α, the predicted covariance must be defined as a positive semidefinite. Second, the order of accuracy must be preserved for both the mean and covariance. See, e.g., "Analysis of scaling parameters of the batch unscented transformation for precision orbit determination using satellite laser ranging data" by J. J. Hyun, L. Hyung-Chul (*Journal of Astronomy and Space Sciences*, 28 (3) (2011) 183-192) and "The scaled unscented transformation" by S. Julier (*Proceedings of the 2002 American Control Conference*, Vol. 6, 2002, pp. 4555-4559), which are both hereby incorporated by reference in their entireties, for more details regarding the effect of scaling parameter α on UKF tuning. In the case study of this disclosure, the scaling parameters have been chosen to be $\alpha=10^{-4}$ and β=2.

κ is a scaling factor that controls how far away from the mean the points may be. A larger κ enables points further away from the mean to be chosen, and a smaller κ enables points nearer the mean to be chosen. Based on EQN. (5), it can be also seen that when κ gets larger, not only the sampled sigma points go further away from the mean, but also the weights of those samples get smaller. In other words, by choosing a larger κ, samples can be chosen further and further away from mean with less weight assigned to those samples. Therefore, choosing an appropriate κ will reduce higher order errors of Tylor's series for predicting the mean and covariance of the states of the system. It can be shown that if x(k) is Gaussian, it is more appropriate to choose k such that n+κ=3. However, if the distribution of x(k) is different, then a different approach is used for choosing κ. A detailed discussion regarding UKF parameters can be found in "A new approach for filtering nonlinear systems" by S. Julier, J. Uhlmann and H. Durrant (*Proceedings of the 1995 American Control Conference*, Vol. 3, 1995, pp. 1628-1632), "A new method for the nonlinear transformation of means and covariances in filters and estimators" S. Julier, J. Uhlmann and H. Durrant-Whyte (*IEEE Transactions on Automatic Control*, 45 (3) (2000) 477-482), and "New extension of the Kalman filter to nonlinear systems" by S. J. Julier and J. K. Uhlmann (*AeroSense'97, International Society for Optics and Photonics*, 1997, pp. 182-193), which are all hereby incorporated by reference in their entireties. In this case study, k=0 is chosen since a total of 7 sigma points are used and n=3.

The predicted sigma points at the k-th step ($\chi_k^-$), the mean $\hat{X}_k^-$) and the covariance ($P_{X_k}^-$) of the k-th step state are described by:

$$\begin{cases} \chi_k^{i-} = f(\chi_{k-1}^i, u_{k-1}), i=0,\ldots,2n \\ \hat{X}_k^- = \sum_{i=0}^{2n} W_{mi}\chi_k^{i-} \\ P_{X_k}^- = \sum_{i=0}^{2n} W_{ci}(\chi_k^{i-}-\hat{X}_k^-)(\chi_k^{i-}-\hat{X}_k^-)^T \end{cases} \quad (6)$$

Note the superscript "-" denotes a prior state or prediction.

Subsequently, the predicted measurement sigma points $\gamma_k^-$ can be generated by finding the predicted sigma points $X_k^-$ through the measurement given by:

$$\gamma_k^{i-}=h(\chi_k^{i-},u_k), i=0,\ldots,2n. \quad (7)$$

Consequently, the weighted mean of the predicted measurement $\hat{y}_k^-$ and the corresponding covariance matrix $P_{y_k}^-$ as well as the cross-correlation matrix $P_{X_k y_k}^-$ can be computed as:

$$\begin{cases} \hat{y}_k^- = \sum_{i=0}^{2n} W_{mi}\gamma_k^{i-} \\ P_{y_k}^- = \sum_{i=0}^{2n} W_{ci}(\gamma_k^{i-}-\hat{y}_k^-)(\gamma_k^{i-}-\hat{y}_k^-)^T + R_w \\ P_{X_k y_k}^- = \sum_{i=0}^{2n} W_{ci}(\chi_k^{i-}-\hat{X}_k^-)(\gamma_k^{i-}-\hat{y}_k^-)^T \end{cases} \quad (8)$$

where $R_w$ is the co-variance matrix related to the measurement noise w. In the correction step, UKF then updates the state using Kalman gain matrix $K_k$. The mean value $\hat{X}_k$ and co-variance matrix $P_{X_k}$ (where the superscript denotes a prior state) can be expressed as:

$$\begin{cases} K_k = P_{X_k y_k}^- (P_{y_k}^-)^{-1} \\ \hat{X}_k = \hat{X}_k^- + K_k[y_k - \hat{y}_k^-]^T \\ P_{X_k} = P_{X_k}^- - K_k P_{y_k}^- K_k^T \end{cases} \quad (9)$$

There are existing general Kalman filter Matlab toolboxes available. In this disclosure, a general EKF/UKF toolbox developed by Helsinki University was used. Specific models of PMU data-based synchronous generator estimation are described in the next section and coded in the toolbox.

Implementation of UKF for Dynamic Model Parameter Estimation

In the disclosed estimation model, a synchronous generator can be considered to be a constant voltage source behind an impedance. The electromechanical dynamics can be described by the following swing equation:

$$\begin{cases} \dfrac{d\delta(t)}{dt} = \omega_s(\omega(t) - \omega_0) \\ \dfrac{d\omega(t)}{dt} = \dfrac{1}{2H}(P_m - P_g(t) - D(\omega(t) - \omega_0)) \end{cases} \quad (10)$$

where $\delta(t)$, $\omega(t)$, $\omega_0$ and $\omega_s$ are the rotor angle in radians, rotor speed in pu, synchronous speed in pu and base speed (377 rad/s), respectively. Rewriting the dynamic equations in the discrete form gives:

$$\begin{cases} \delta_k = \delta_{k-1} + (\omega_{k-1} - \omega_0)\omega_s \Delta t \\ \omega_k = \omega_{k-1} + \dfrac{\Delta t}{2H_{k-1}}(P_{m_{k-1}} - P_{g_{k-1}} - D_{k-1}(\omega_{k-1} - \omega_0)) \end{cases} \quad (11)$$

where $\Delta t$ is the sample period. The PMU measured data can be separated into two groups. One group can be treated as the input signals to the dynamic model and the other group can be treated as the outputs or measurements. A PMU can be used to provide five sets of data at a generator terminal bus: voltage magnitude ($V_g$), voltage phase angle ($\theta$), active power ($P_g$), reactive power ($Q_g$), and frequency (f). The PMU data contains only the positive sequence in this application based on the assumption that the system is operated under balanced conditions. Based on the swing equation, the state vector of the system is defined as $x_k = [\delta_k \; \omega_k]^T$. If the parameters (unknown mechanical power $P_m$, inertia constant H and damping coefficient D) of the model are treated as state variables, the augmented state vector will be $X_k = [\delta_k \; \omega_k \; P_{m_k} \; H_k \; D_k]^T$.

In this disclosure, terminal voltage magnitude ($V_g$) and generator exported power ($P_g$) can be used as the input signals, and the terminal voltage phasor angle ($\theta$) together with the reactive power can be treated as the output signals. The relationship between input and output signals can be written as follows:

$$\begin{cases} P_g = \dfrac{E_q V_g}{x_d'} \sin(\delta - \theta) \\ Q_g = \dfrac{E_q V_g \cos(\delta - \theta) - V_g^2}{x_d'} \end{cases} \quad (12)$$

EQN. (12) can be rewritten as:

$$\begin{cases} E_q V_g \sin(\delta - \theta) = P_g x_d' \\ E_q V_g \cos(\delta - \theta) = \sqrt{(E_q V_g)^2 - (P_g x_d')^2} \end{cases} \quad (13)$$

Based on EQN. (13), the output signals can be expressed by the input signals and state variables as follows:

$$\begin{cases} \theta_{g_k} = \delta_k - \tan^{-1}\left(\dfrac{P_{g_k} x_{d_k}'}{\sqrt{(E_{q_k} V_{g_k})^2 - (P_{g_k} x_{d_k}')^2}}\right) \\ Q_{g_k} = \dfrac{\sqrt{(E_{q_k} V_{g_k})^2 - (P_{g_k} x_{d_k}')^2} - V_{g_k}^2}{x_{d_k}'} \end{cases} \quad (14)$$

Primary and Secondary Frequency Control.

In the case that a system loses its power balance, the primary frequency control of synchronous generators can adjust the mechanical power reference point to a new value based on the frequency deviation. Referring to FIG. 1, shown is an example of a synchronous generator model including primary frequency control 133 and secondary frequency control 136. The primary frequency control 133 comprises a proportional block 139 with the deviation of frequency $\Delta f$ or rotor speed $\Delta \omega$ as the input, the change in the mechanical power reference $P_{ref}$ as the output. If the frequency is below the nominal value, the mechanical power $P_m$ should be increased. Otherwise, the mechanical power $P_m$ will be decreased. The system frequency f will achieve steady state after such compensation. However, the steady-state frequency will deviate from the nominal value. A secondary frequency control loop 136 can be added in order to bring the frequency f back to its normal value. The secondary frequency control 136 is mainly composed of an integral block 142

$$\left(\dfrac{k_i}{s} = \dfrac{K_i}{s}\right)$$

as shown in FIG. 1. The integral unit senses the deviation in frequency $\Delta f$ or rotor speed $\Delta \omega$ and adjusts the reference power $P_c$. This way, the generator will be able to adjust its power input in response to the system load change.

In FIG. 1, R is the speed regulation constant, 1/R is the droop gain, and $T_r$ is the turbine-governor time constant. Considering the frequency controls, additional dynamic equations are as follows:

$$\dfrac{dP_m}{dt} = \dfrac{1}{T_r}\left(P_{ref} - P_c - P_m - \dfrac{1}{R}(\omega - \omega_0)\right). \quad (15)$$

Rewriting (15) in the discrete form gives:

$$P_{m_k} = P_{m_{k-1}} + \dfrac{\Delta t}{T_r}\left(P_{ref} - P_{c_{k-1}} - P_{m_{k-1}} - \dfrac{1}{R}(\omega_{k-1} - \omega_0)\right). \quad (16)$$

Similarly, the secondary frequency control can be written as:

$$P_{c_k} = P_{c_{k-1}} + (\omega_{k-1} - \omega_0) K_{i_{k-1}} \Delta t. \quad (17)$$

The state vector of the system is now defined as $x_k = [\delta_k \; \omega_k \; P_{m_k} \; P_{c_k}]^T$. If the parameters of the model are treated as state variables, the augmented state vector can be given as $X_k = [\delta_k \; \omega_k \; P_{m_k} \; P_{c_k} \; R_k \; K_{i_k} \; H_k \; D_k]^T$. The complete generator estimation model is presented as follows:

$$\begin{cases} \delta_k = \delta_{k-1} + (\omega_{k-1} - \omega_0)\omega_s \Delta t \\ \omega_k = \omega_{k-1} + \dfrac{\Delta t}{2H_{k-1}}(P_m - P_{g_{k-1}} + D_{k-1}(\omega_{k-1} - \omega_0)) \\ P_{m_k} = P_{m_{k-1}} + \dfrac{\Delta t}{T_{r_k}}\left(P_{ref} - P_{c_{k-1}} - P_{m_{k-1}} - \dfrac{1}{R_k}(\omega_{k-1} - \omega_0)\right) \\ P_{c_k} = P_{c_{k-1}} + (\omega_{k-1} - \omega_0) K_{i_{k-1}} \Delta t \\ R_k = R_{k-1} \\ K_{i_k} = K_{i_{k-1}} \\ H_k = H_{k-1} \\ D_k = D_{k-1} \\ T_{r_k} = T_{r_{k-1}} \end{cases} \quad (18)$$

The model can be adapted for PMU data-based estimation to enhance the convergence of the UKF algorithm. Some parameters can be converted to new parameters in the estimation process. The detailed conversion will be illustrated in the following case studies.

Case Studies

Case Study Based on Simulation Data.

Figure 2:
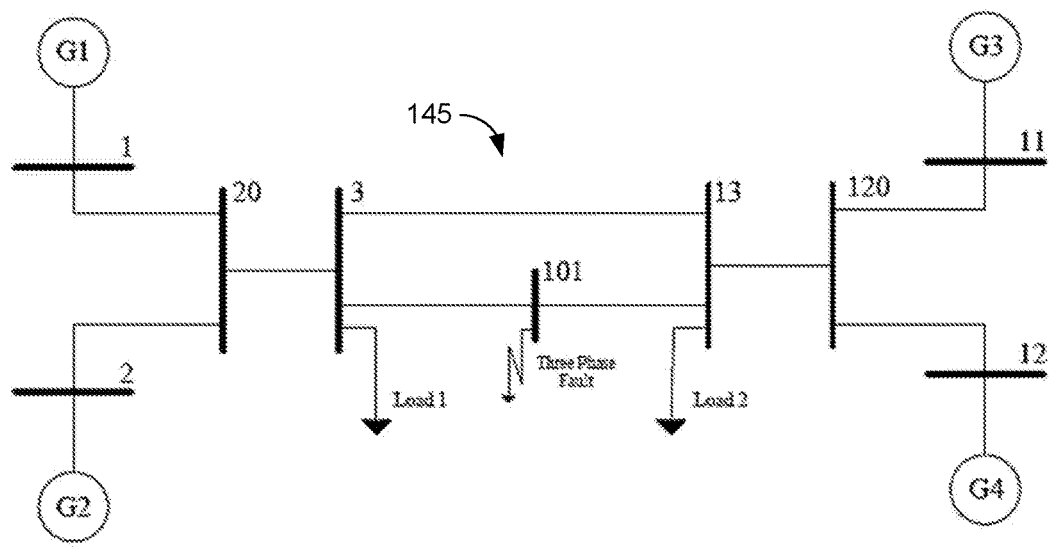
FIG. 2 is a schematic diagram illustrating an example of a power system in accordance with various embodiments of the present disclosure.
Figure 3A:
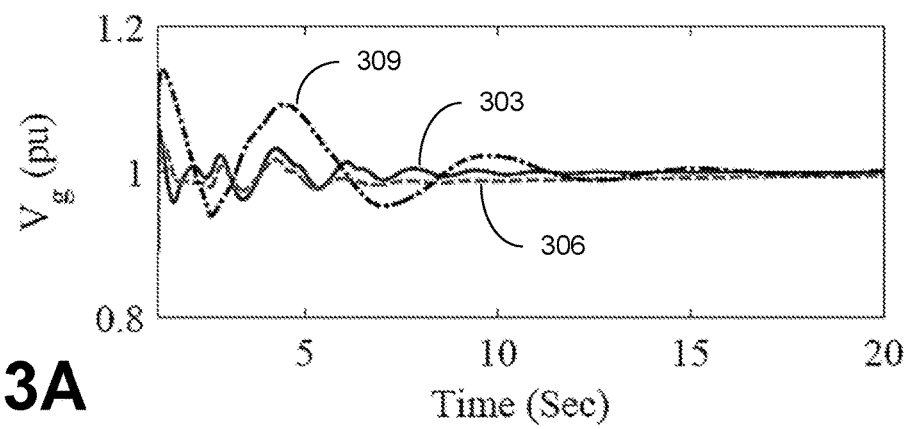
Figure 3B:
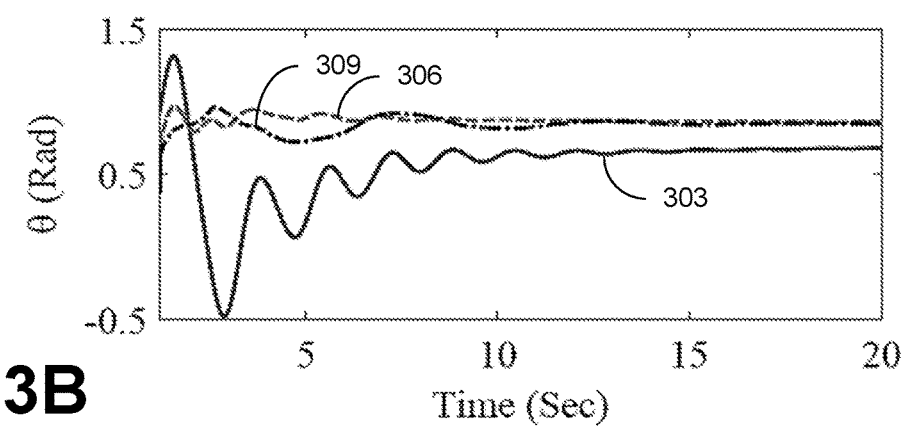
Figure 3C:
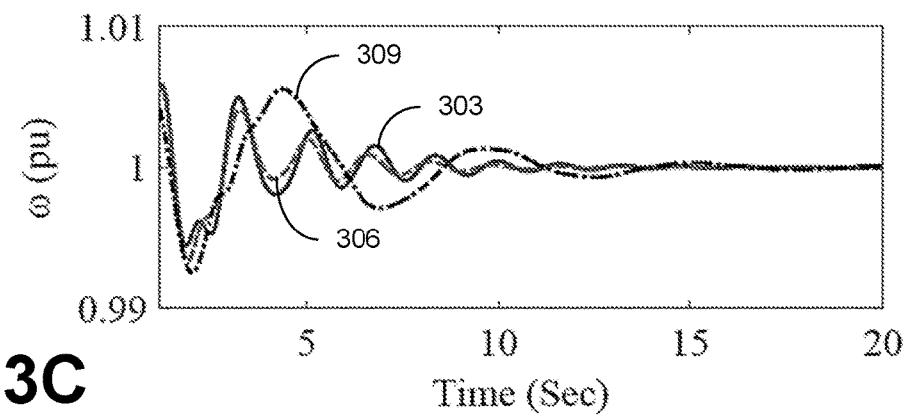

To generate PMU data for the case study, time-domain simulation data was generated using Matlab/SimPowerSystems. Demos in Matlab/SimPowerSystems include a classic two-area nice-bus system shown in FIG. 2. This system comprises four generators (G1-G4) in two areas. Two tie-lines 145 connect these two areas. At t=1 second, a three-phase low impedance fault occurred at Bus 101. After 0.2 second, the fault was cleared. A PMU was used to record power, voltage, and the frequency data from the terminal bus of Gen 1. The sampling interval was 0.01 second.

Three sets of data were recorded and used to test UKF method. FIGS. 3A-3E illustrate the three data sets for voltage magnitude ($V_g$) in FIG. 3A, voltage phase angle ($\theta$) in FIG. 3B, rotor speed ($\omega$) in FIG. 3C, active power ($P_g$) in FIG. 3D, and reactive power ($Q_g$) in FIG. 3E. Each set of data represents a different model for Generator 1 in the simulation studies.

- Set 1 (solid lines 303): For benchmarking, the classical generator model (a constant voltage source behind a transient reactance) was used in the simulation. In this case, the dynamic model used in UKF was exactly the same as the simulation model.
- Set 2 (dashed lines 306): A subtransient model which included all damping winding dynamics was used to represent Generator 1 in simulation. In the estimation model, the dynamics related to the flux and damping winding has all been ignored.
- Set 3 (dot-dashed lines 309): The power system stabilizer (PSS), automatic voltage regulator (AVR), and excitation system were added to the subtransient generator model in this simulation. Adding the PSS, AVR, and excitation system added transients to the internal voltage of generator ($E_q$). In the estimation model, $E_q$ was assumed to be constant.

In addition, the turbine-governor and the primary and secondary frequency control models that were the same as those in the estimation model have been considered in the Matlab/SimPowerSystems-based simulation. The generator parameters can be found in the table of FIG. 4. At least two initial estimates for each parameter were used to demonstrate that the UKF can converge to the same estimation.

Parameter Conversion. In the process of UKF tuning, it was found that direct estimation of R, $T_r$ and H led to a decreased rate of convergence. From EQN. (18), it can be anticipated that the state variables $\omega$ and $P_m$ are linearly related to 1/2H, 1/R and 1/$T_r$R respectively. Therefore, a small change in R, $T_r$ and H results in big fluctuations in $P_m$ and $\omega$. In other words, the output measurements have insignificant sensitivity to the parameters R, $T_r$ and H, which can make the filter tuning very difficult. To address this issue, parameters $$G = \frac{100}{2H}, J = \frac{1}{T_r R}$$

and $$N = \frac{1}{T_r}$$

were estimated. With such changes, ignoring the damping coefficient (D), EQN. (18) can be rewritten as:

$$\begin{cases} \delta_k = \delta_{k-1} + (\omega_{k-1} - \omega_0)\omega_s \Delta t \\ \omega_k = \omega_{k-1} + \frac{G_{k-1}}{100}(P_m - P_{g_{k-1}})\Delta t \\ P_{m_k} = P_{m_{k-1}} + N_{k-1}(P_{ref} - P_{c_{k-1}} - P_{m_{k-1}})\Delta t - J_{k-1}(\omega_{k-1} - \omega_0)\Delta t \\ P_{c_k} = P_{c_{k-1}} + (\omega_{k-1} - \omega_0)K_{i_{k-1}}\Delta t \\ G_K = G_{k-1} \\ M_K = M_{k-1} \\ J_K = J_{k-1} \\ K_{i_k} = K_{i_{k-1}} \end{cases} \quad (19)$$

PMU data for V, $\theta$, P, and Q can be used as an input-output for Kalman filtering. However, frequency control parameters are also estimated in this disclosure. Based on experience, convergence of the estimation is problematic without frequency measurements from the generator terminal bus. Therefore, the frequency of generator terminal bus should be recorded and used as an output. A simplifying assumption can also be made where the frequency measured at the generator terminal bus is equivalent to the rotor speed (w) in per unit. The output signals can be written in terms of the input signals and state variables in the discrete form as:

$$\begin{cases} \theta_{g_k} = \delta_k - \tan^{-1}\left(\frac{P_{g_k} x'_{d_k}}{\sqrt{(E_{q_k} V_{g_k})^2 - (P_{g_k} x'_{d_k})^2}}\right) \\ Q_{g_k} = \frac{\sqrt{(E_{q_k} V_{g_k})^2 - (P_{g_k} x'_{d_k})^2} - V_{g_k}^2}{x'_{d_k}} \\ f_k = \omega_k \end{cases} \quad (20)$$

For this estimation model, $E_q$, $P_{ref}$, $x'_d$ are assumed to be known. In the UKF algorithm, P is the co-variance matrix of the state variables, $X_0$ is the initial estimate of the augmented state vector and $P_0$ is the initial estimate for the co-variance matrix P. Estimation accuracy is not sensitive to the initial guess of the parameters or state variables. The initial estimate for the covariance matrix ($P_0$) will influence the convergence rate. Therefore, fine tuning of $P_0$ is needed. Additionally, Q is the co-variance matrix of the process noise and was kept constant for all three sets of data. The table of FIG. 5 shows the initial estimates for $X_0$ and $P_0$ as well as the diagonal elements of the process noise matrix Q. The covariance matrix of the output measurement noise is given by $R_w$=diag($10^{-15}$ $10^{-15}$ $10^{-15}$).

Figure 6A:
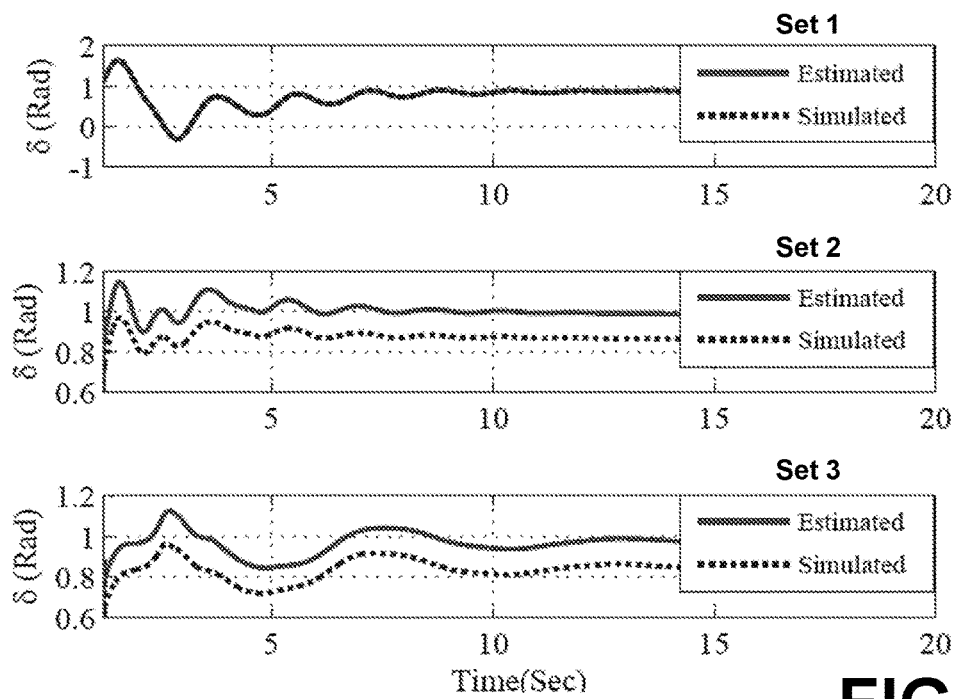
FIGS. 6A through 6D illustrate a comparison of estimated states of the synchronous generator model with frequency control to simulation model states in accordance with various embodiments of the present disclosure.
Figure 6B:
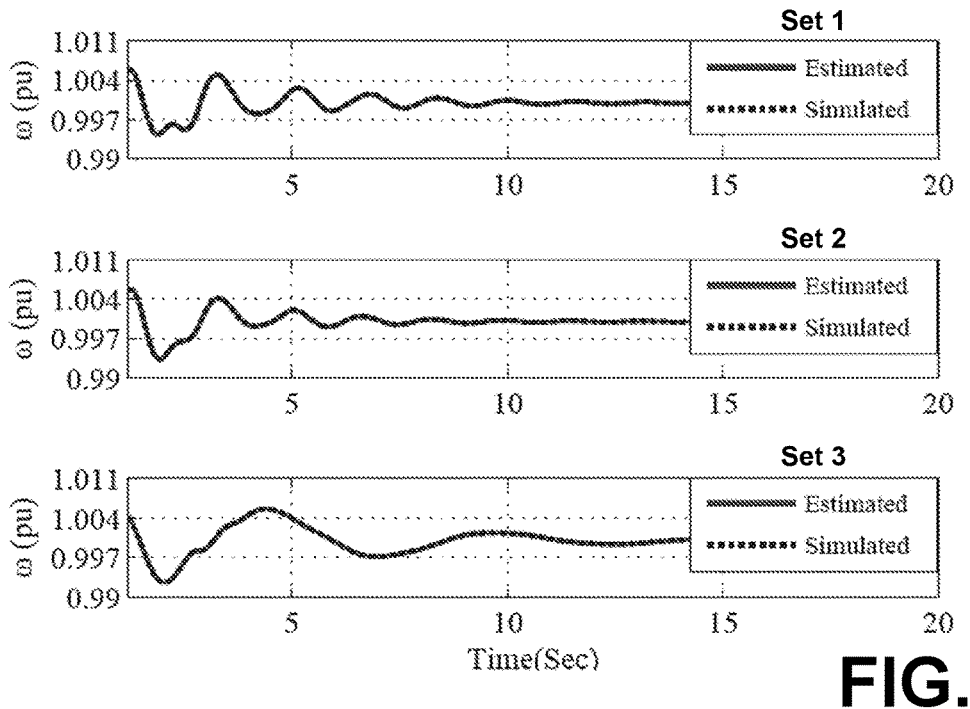
Figure 6C:
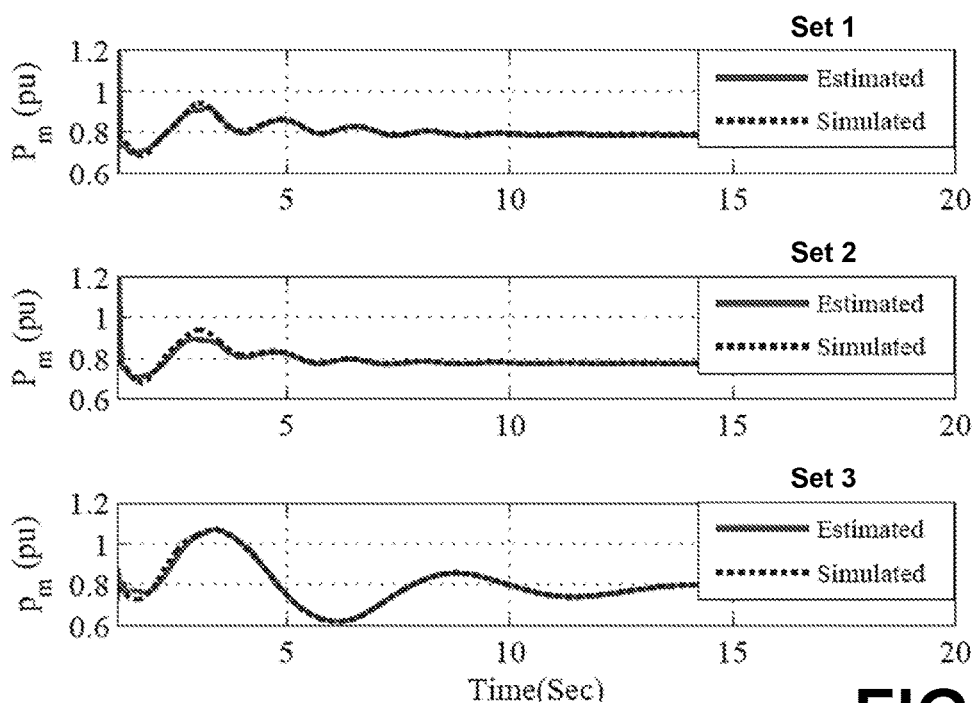
Figure 6D:
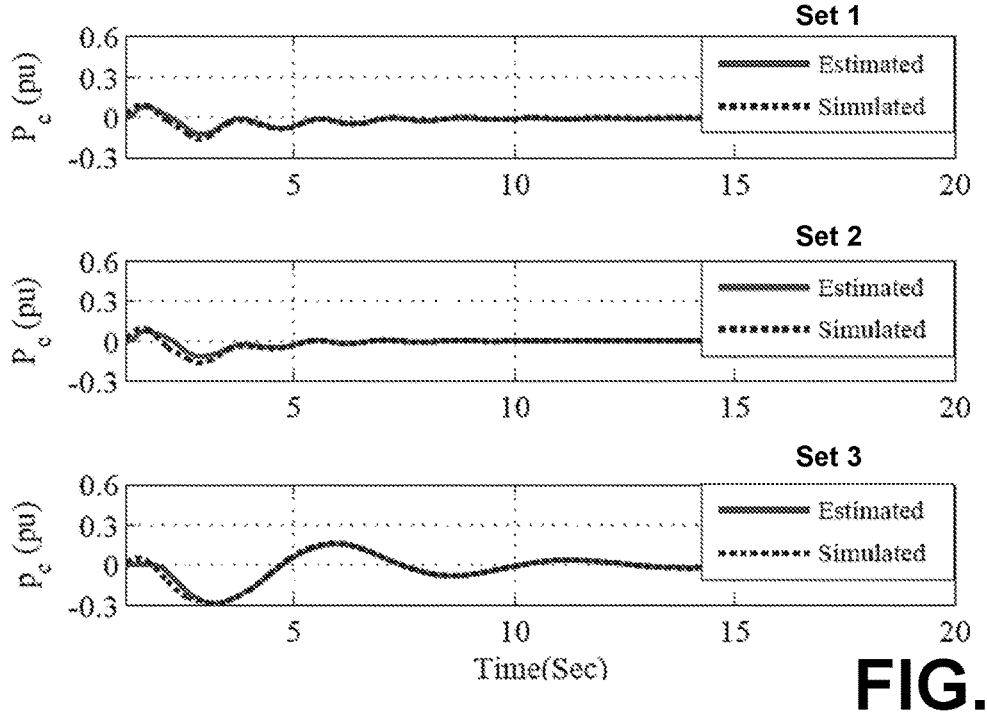

FIGS. 6A-6D present examples of the estimation of states compared to the states from the simulation model. FIG. 6A shows the estimation and simulation results for the rotor angle ($\delta$) of sets 1, 2 and 3. FIG. 6B shows the estimation and simulation results for the rotor speed ($\omega$) of sets 1, 2 and 3. FIG. 6C shows the estimation and simulation results for the mechanical power ($P_m$) of sets 1, 2 and 3. FIG. 6D shows the estimation and simulation results for the mechanical power reference point ($P_c$) of sets 1, 2 and 3. As it can be seen, because the same classic generator model was used for both the estimation and simulation, the rotor angle estimation matched the simulated rotor angle exactly for the scenario of set 1. In both set 2 and set 3, the subtransient generator model was used in simulation while the classic generator model was employed in the estimation model. Therefore, there was a discrepancy between the rotor angles from the estimation and simulation, though the dynamic trends match each other well.

Figure 7A:
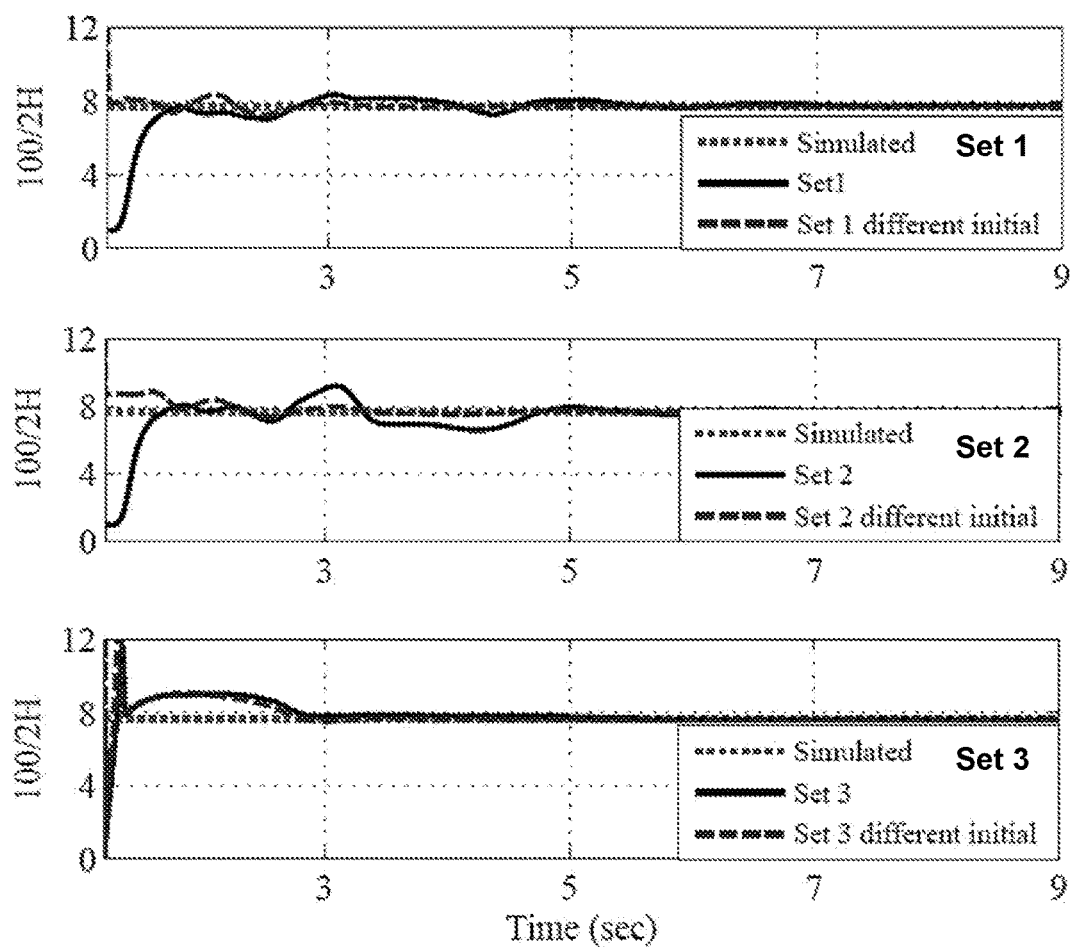
FIGS. 7A through 7D illustrate a comparison of estimated parameters (based on a four-parameter model) from two starting estimates to the real parameter values in accordance with various embodiments of the present disclosure.
Figure 7B:
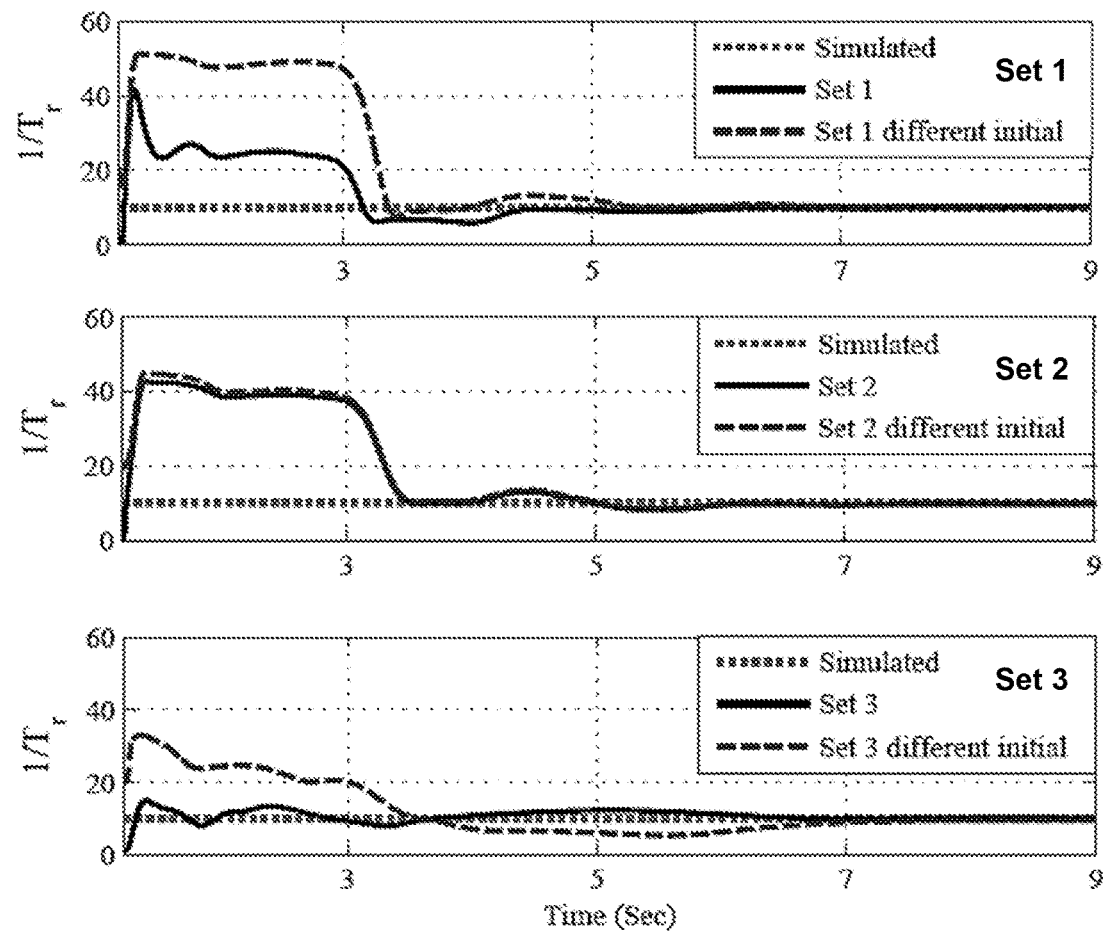
Figure 7C:
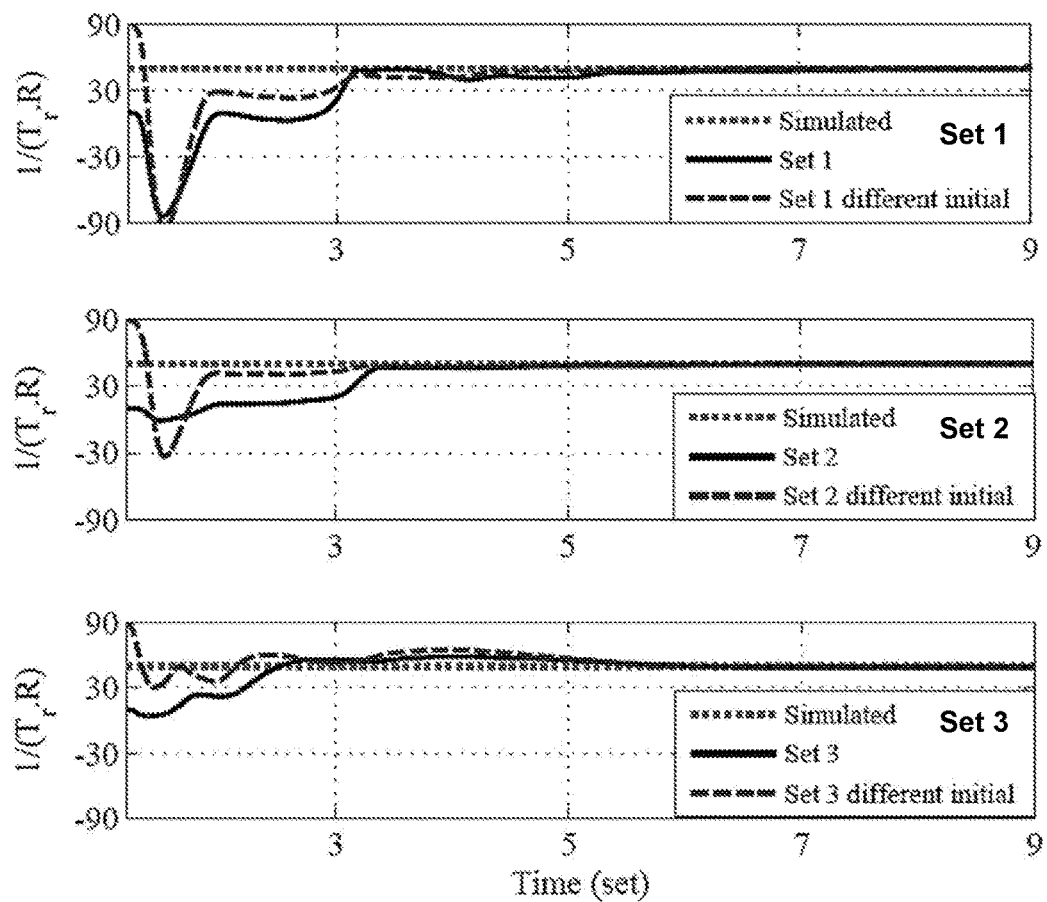
Figure 7D:
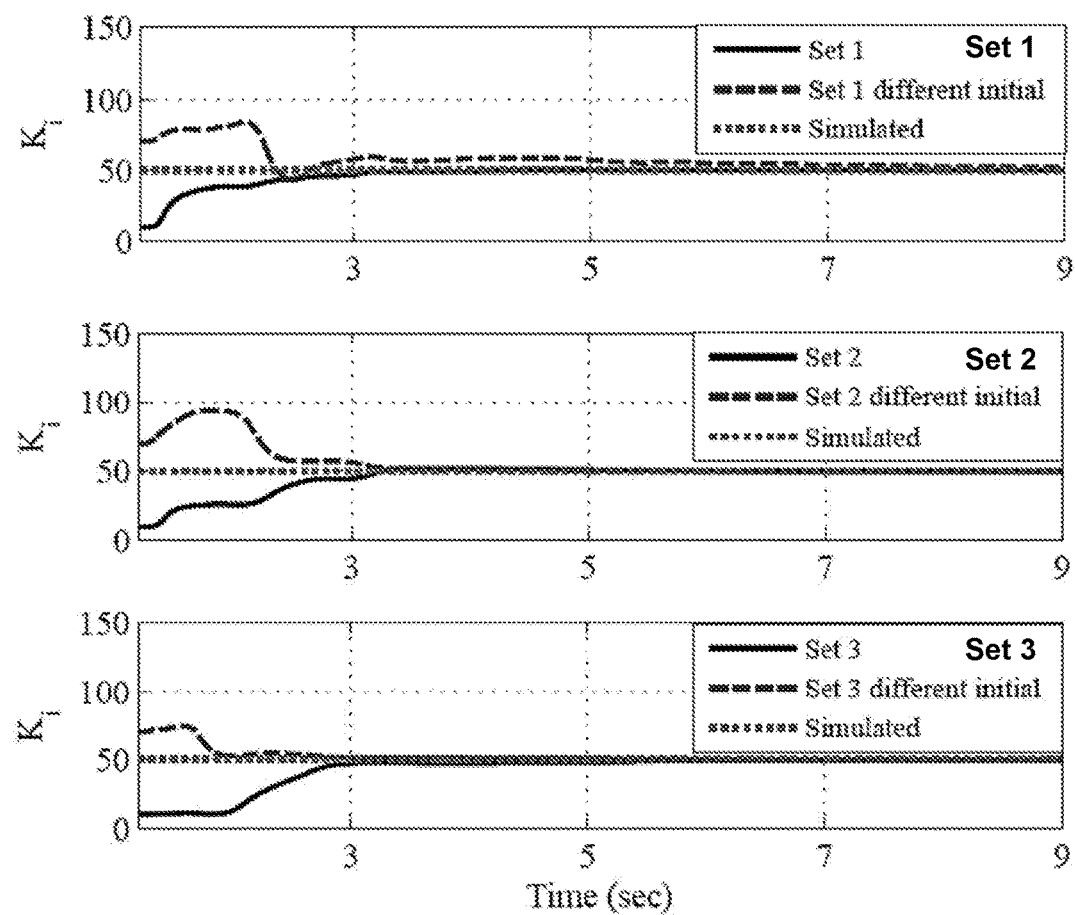

FIGS. 7A-7D show examples of the estimation results for two initial estimates and the simulation results. FIG. 7A shows the estimation and simulation results for the inertia constant (H), FIG. 7B shows the estimation and simulation results for turbine-governor time constant ($T_r$), FIG. 7C shows the estimation and simulation results for droop regulation (R) and FIG. 7D shows the estimation and simulation results for the secondary frequency control integrator gain ($K_i$). It was found that even for a complicated generator model equipped with PSS and AVR, UKF can estimate all parameters and state variables with good accuracy.

Measurement Noises.

In previous scenarios, the measurement errors were assumed to be a normal distribution and very small variance, e.g., $10^{-15}$. In order to show the effect of noise of normal distribution on the disclosed process, three different simulation scenarios were carried out by adding 1%, 2% and 5% Gaussian noise to set 3 of the recorded data. The estimation results were compared to the previous parameters estimation. The table of FIG. 8 presents the results for those scenarios. As would be expected, it can be seen from the table of FIG. 8 that the estimation error increases exponentially with an increasing variance of the measurement noise. Although the error of the estimation increases with respect to the increasing level of measurement noise, the results of the disclosed method still shows acceptable accuracy for the most of its applications.

Model Validation.

In the validation step, estimated parameters can be used to build a low order generator dynamic simulation model as shown in FIG. 1. Then, event playback can be used to validate the estimation model. During event play back, hybrid dynamic simulation injects the inputs (measured PMU data) to the low-order dynamic simulation model, output from the model can be captured and compared with the actual measurements.

Figure 9:
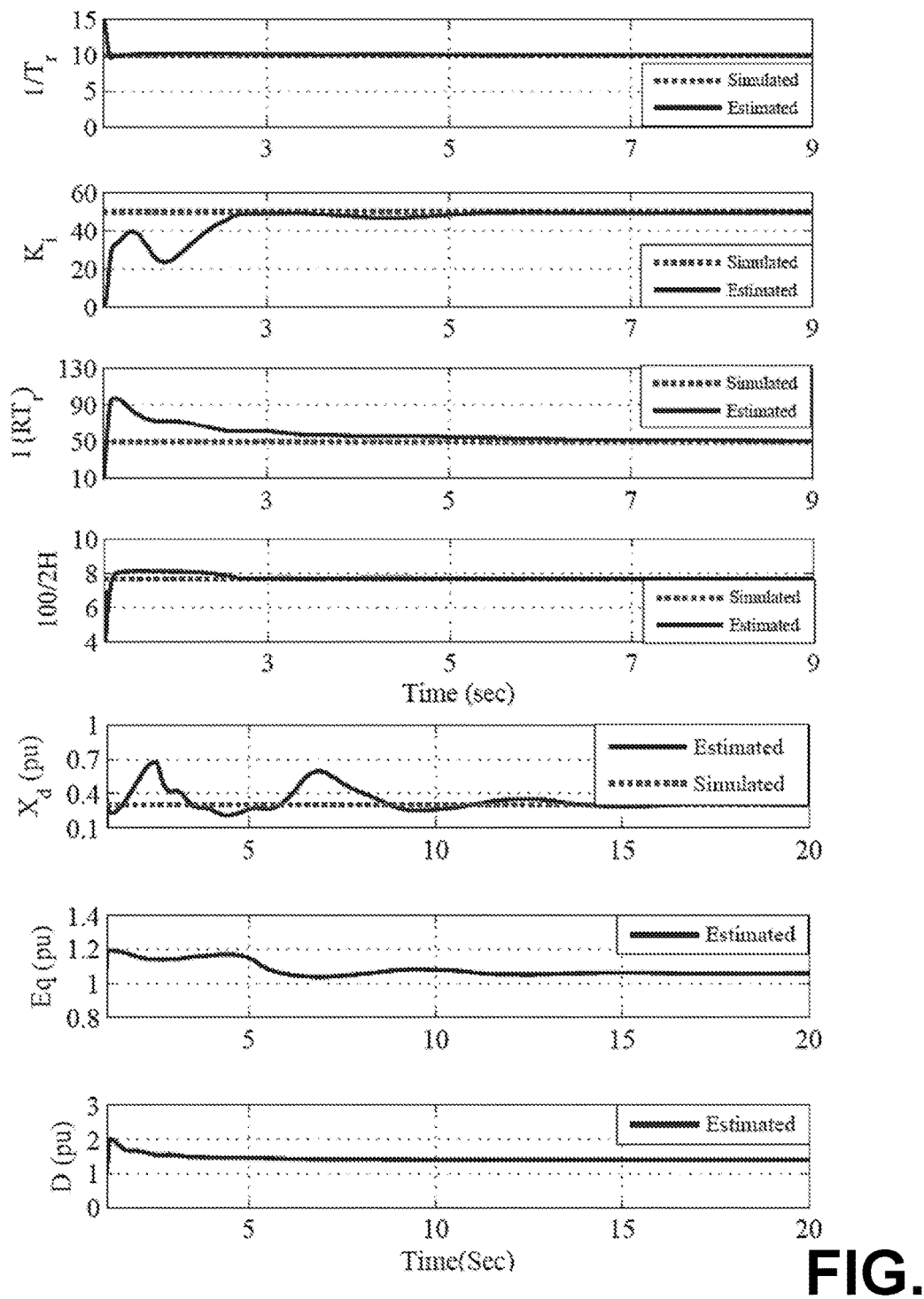
FIG. 9 illustrates a comparison of Kalman filter parameter estimations based on a seven-parameter model to the real parameter values in accordance with various embodiments of the present disclosure.

In the previous sections, although UKF were used to estimate parameters, some parameters such as $x'_d$ and $E_q$ are assumed to be known. Moreover, all the generator model needs to have is an appropriate damping ratio to stabilize the system. Therefore, the UKF method can be adjusted to estimate all the parameters of the model. In other words, the transient reactance($x'_d$), generator internal voltage ($E_q$) and generator damping ratio (D) can be added to the parameters which are estimated by the UKF method. Thus, the augmented state vector would be $X_k=[\delta_k\ \omega_k\ P_{m_k}\ P_{c_k}\ G_k\ J_k\ M_k\ K_{i_k}\ x'_{d_k}\ E_{q_k}\ D_k]^T$. The PMU data are presented in FIGS. 3A-3E. The Kalman filter's parameter estimations are illustrated in FIG. 9.

Figure 10:
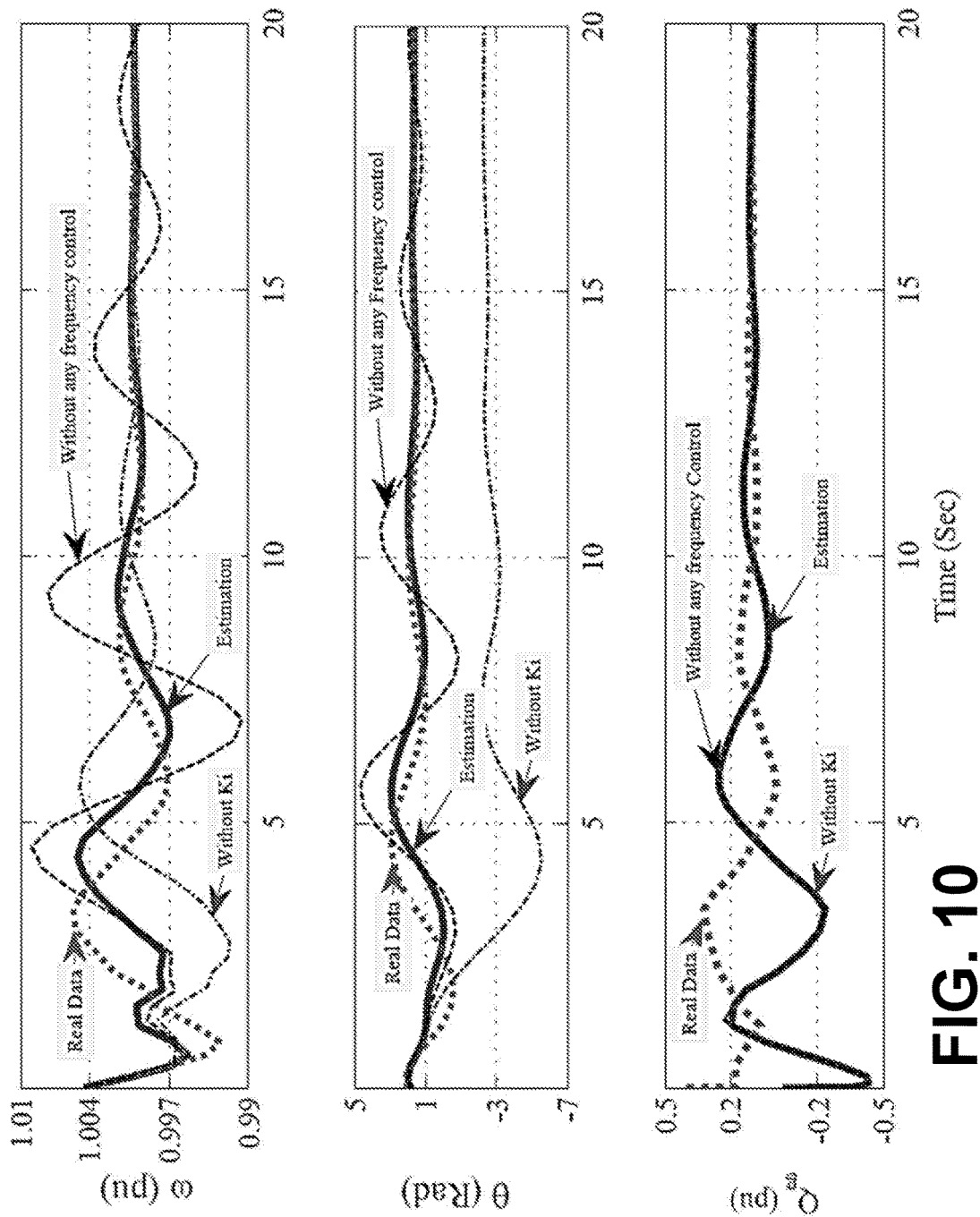
FIG. 10 illustrates an example of event playback validation results of the synchronous generator model with frequency control in accordance with various embodiments of the present disclosure.
Figure 12A:
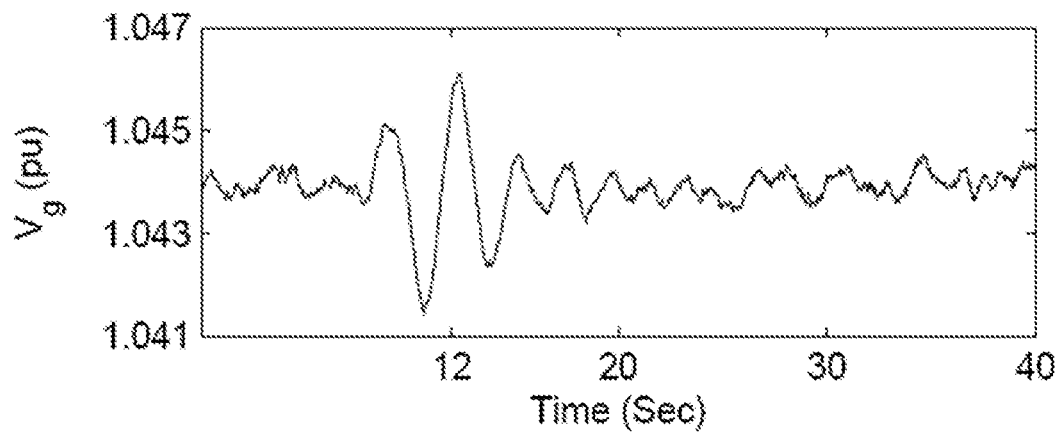
Figure 12B:
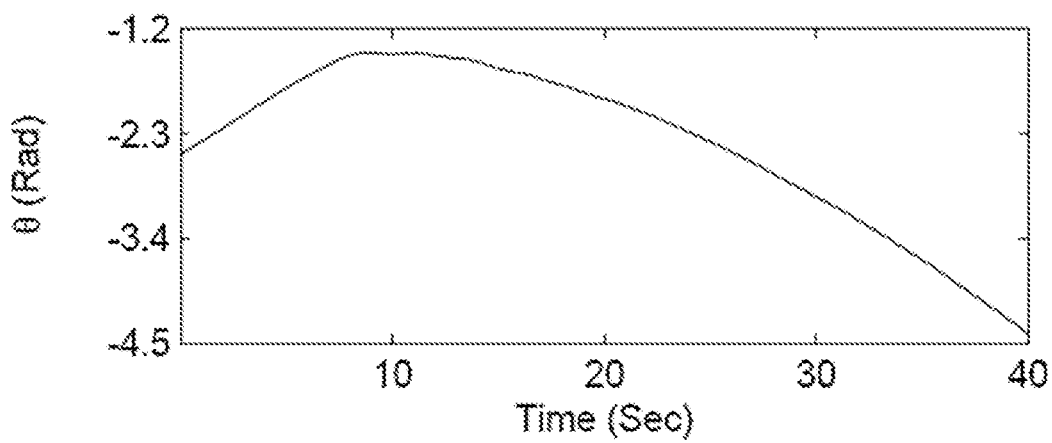
Figure 12C:
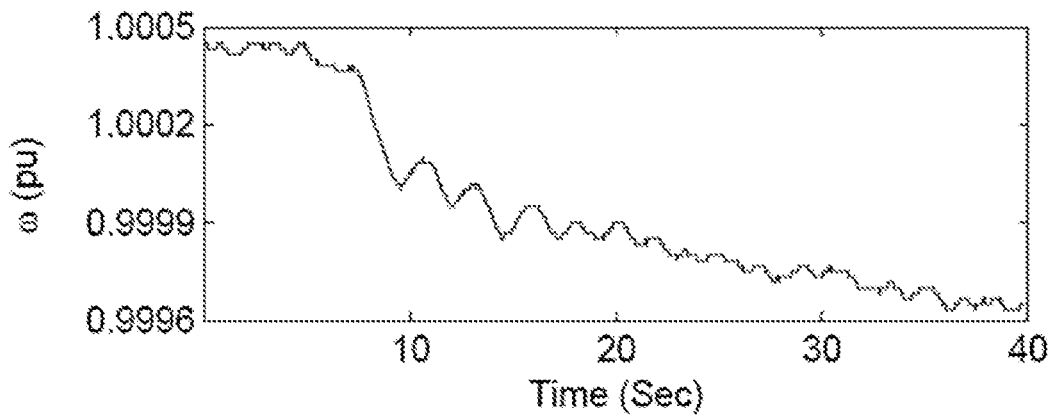

The estimated parameters were used to build a continuous dynamic model of the generator in Matlab/Simulink. Next, input data (e.g., active power and voltage magnitude) can be fed into the model to generate outputs. Frequency and reactive power, along with voltage phase angle, were then compared with the data measurements. FIG. 10 shows the results of the validation for rotor speed ($\omega$), voltage phase angle ($\theta$), and reactive power ($Q_g$). Three sets of models were constructed: a first with all parameters included (estimation), a second one without considering secondary frequency control (without $K_i$) and a third one without considering any frequency control system (without R and $T_r$). As demonstrated in FIG. 10, considering the frequency control systems in the estimation model greatly improved the match of the outputs and the PMU data.

Case Study Based on Real-World PMU Data.

In this section, UKF method was applied to PMU data from an anonymous busbar of the MISO system to estimate parameters of a generator dynamic model. In real world applications, the only data available may be limited to PMU measurements. Equivalent dynamic models are sought. Therefore, it can be anticipated that for the real-world application, all the parameters of the generator are unknown and have to be estimated by the UKF method. The augmented state vector will be $X_k=[\delta_k\ \omega_k\ P_{m_k}\ P_{c_k}\ G_k\ J_k\ M_k\ K_{i_k}\ x'_{d_k}\ E_{q_k}\ D_k]^T$. The initial estimation of the state variables $X_0$ and its covariance matrix $P_0$ as well as the covariance matrix for the processing noise are listed in the table of FIG. 11.

Figure 14:
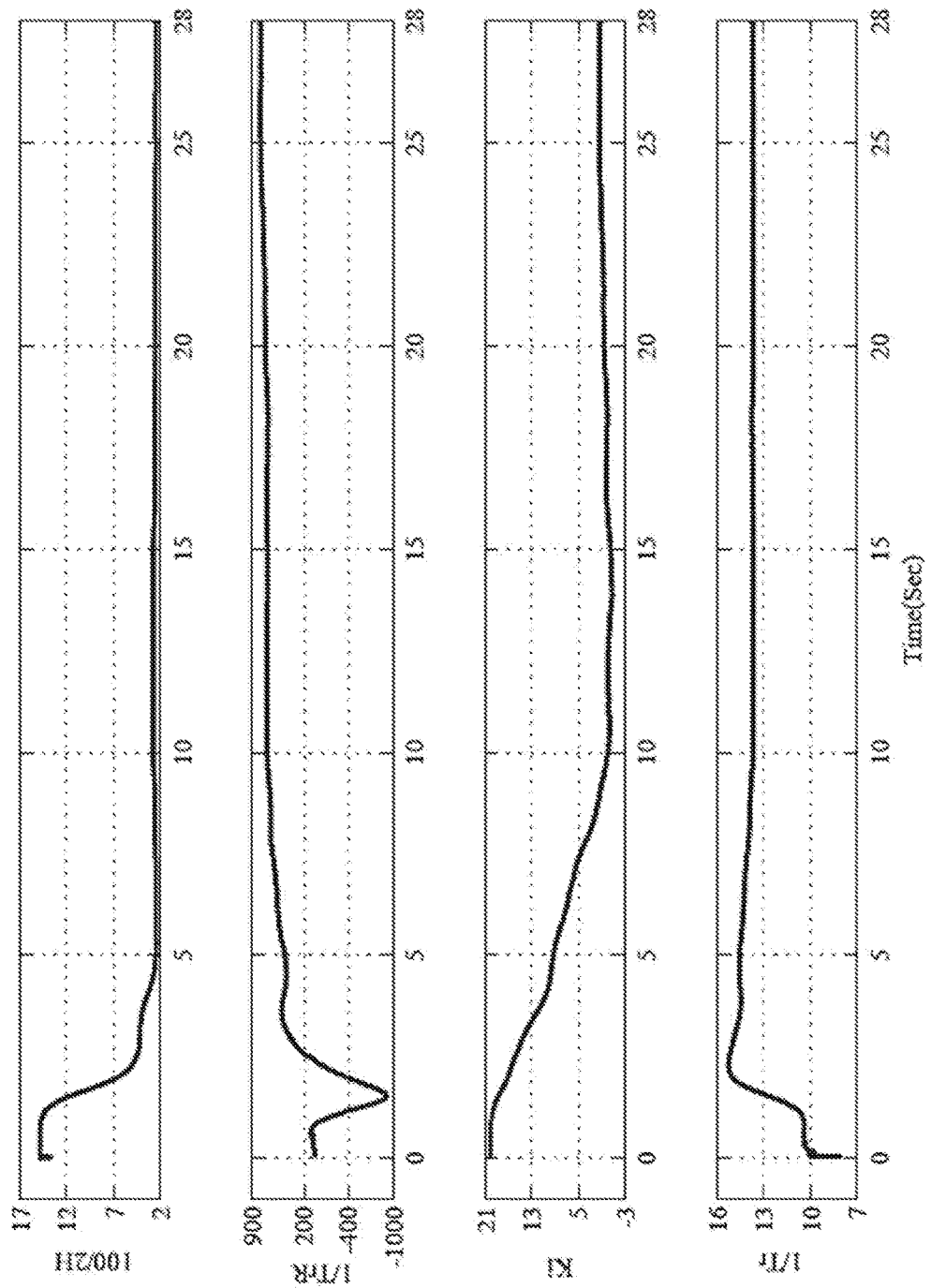
FIG. 14 illustrates examples of various estimation processes using the measured PMU data in accordance with various embodiments of the present disclosure.
Figure 14:
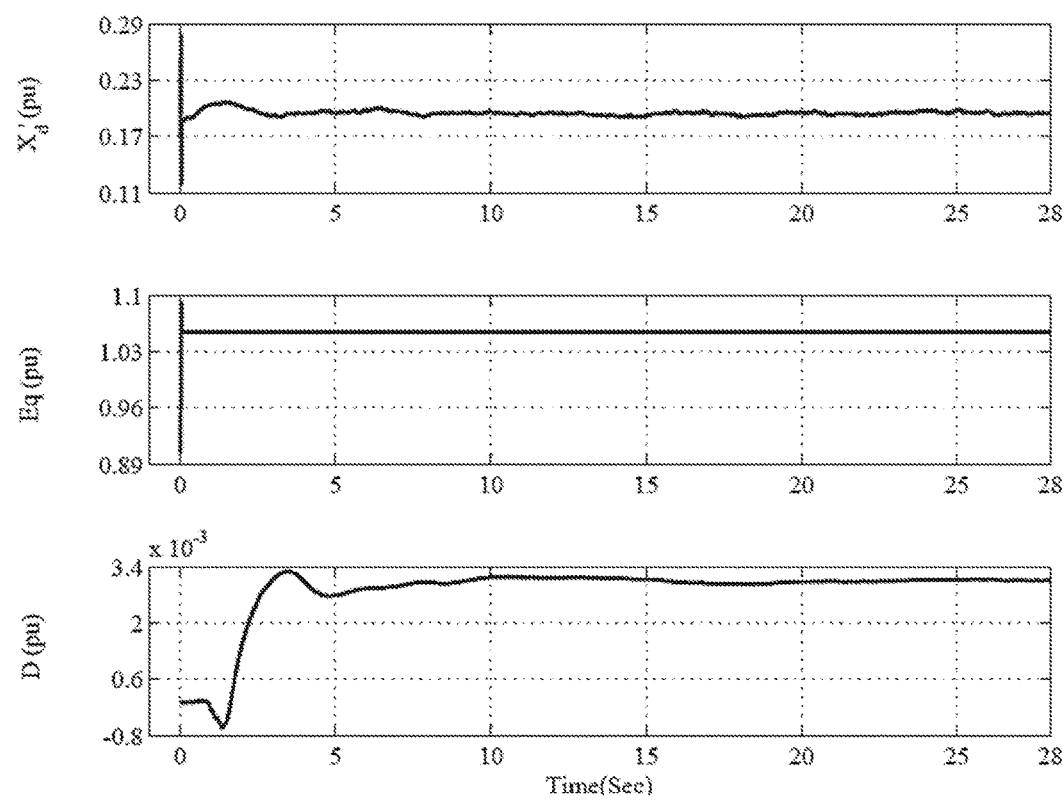

FIGS. 12A-12E show the real-world PMU data obtained over a period of 40 seconds by a PMU installed at a 500 kV substation. The data has been scaled to pu values, where $S_b=1000$ MW and $V_b=500$ kV. The set of data was recorded by the PMU after a generator trip event. The data contains significant noise. The PMU data was obtained with a 30 Hz sampling rate. Data starting from 12 seconds to 40 seconds were used for the estimation. Note in FIGS. 14 and 15, the starting time (t=0) corresponds to the 12 second point in FIGS. 12A-12E. The experiments showed that a 30 Hz sampling rate did not yield satisfactory performance of the UKF. This finding concurs with previous findings that measurement interpolation is needed to improve the performance of the Kalman filters. These experiments show that the real data needed to be interpolated to 100 Hz in order for the UKF method to converge. The table of FIG. 13 documents the final parameter estimation results. FIG. 14 illustrates examples of various estimation processes using the real-world PMU data.

Figure 15:
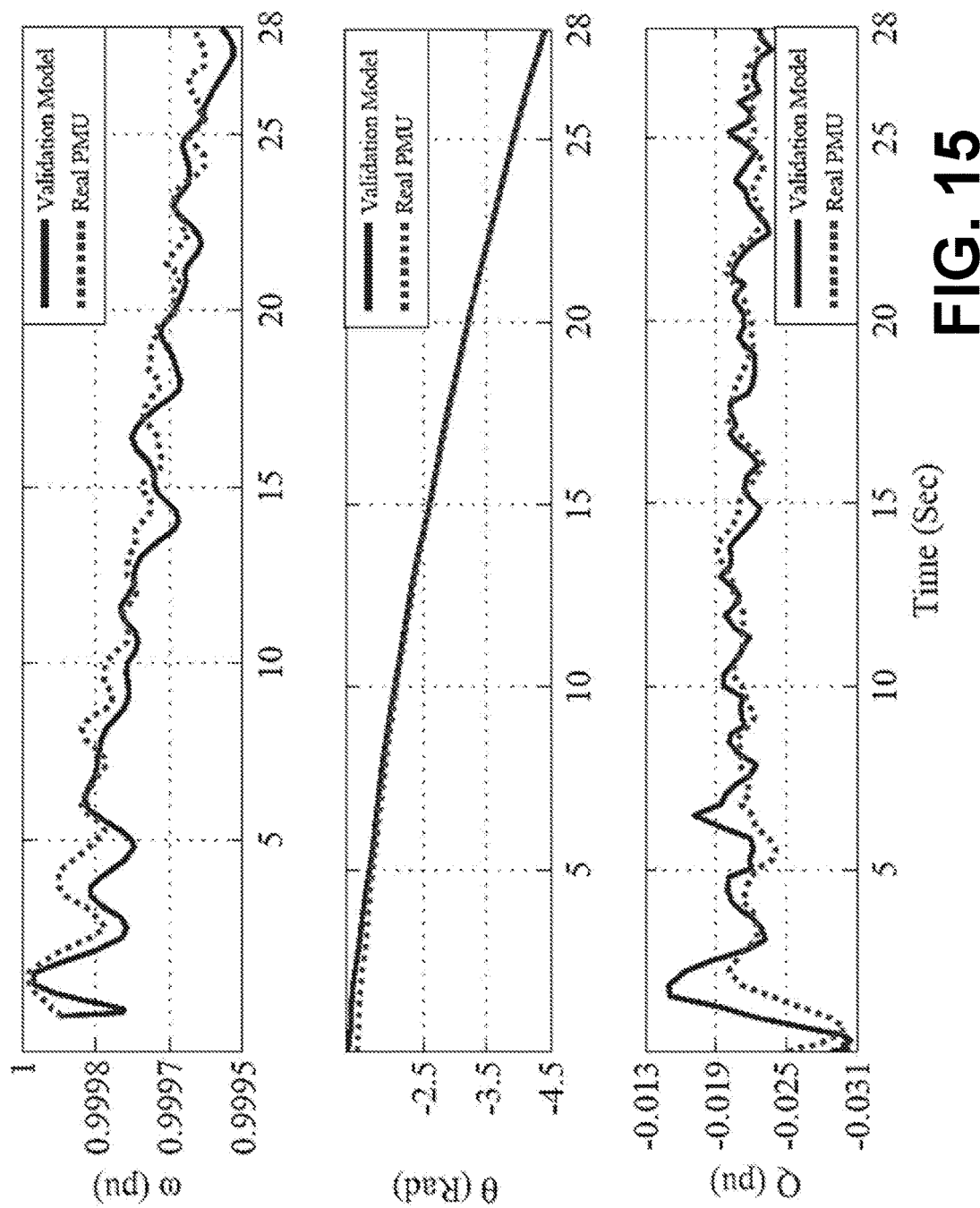
FIG. 15 illustrates an example of event playback validation results of the synchronous generator model with frequency control using the measured PMU data in accordance with various embodiments of the present disclosure.

In the next step, the low-order model was built in Matlab/Simulink using the estimated parameters. Event playback was used to inject voltage magnitude ($V_g$) and active power ($P_g$) as inputs. The outputs from the estimated model and the output PMU measurements of frequency or rotor speed ($\omega$), voltage phase angle ($\theta$) and reactive power ($Q_9$) were compared. FIG. 15 shows the validation results. It is observed that despite the high level of noise and unknown dynamic system model structure, comparison of the PMU data with the validation model outputs shows a good degree of match. The real-world PMU data case study demonstrates the feasibility of the disclosed estimation model in identifying a generator model.

Figure 16:
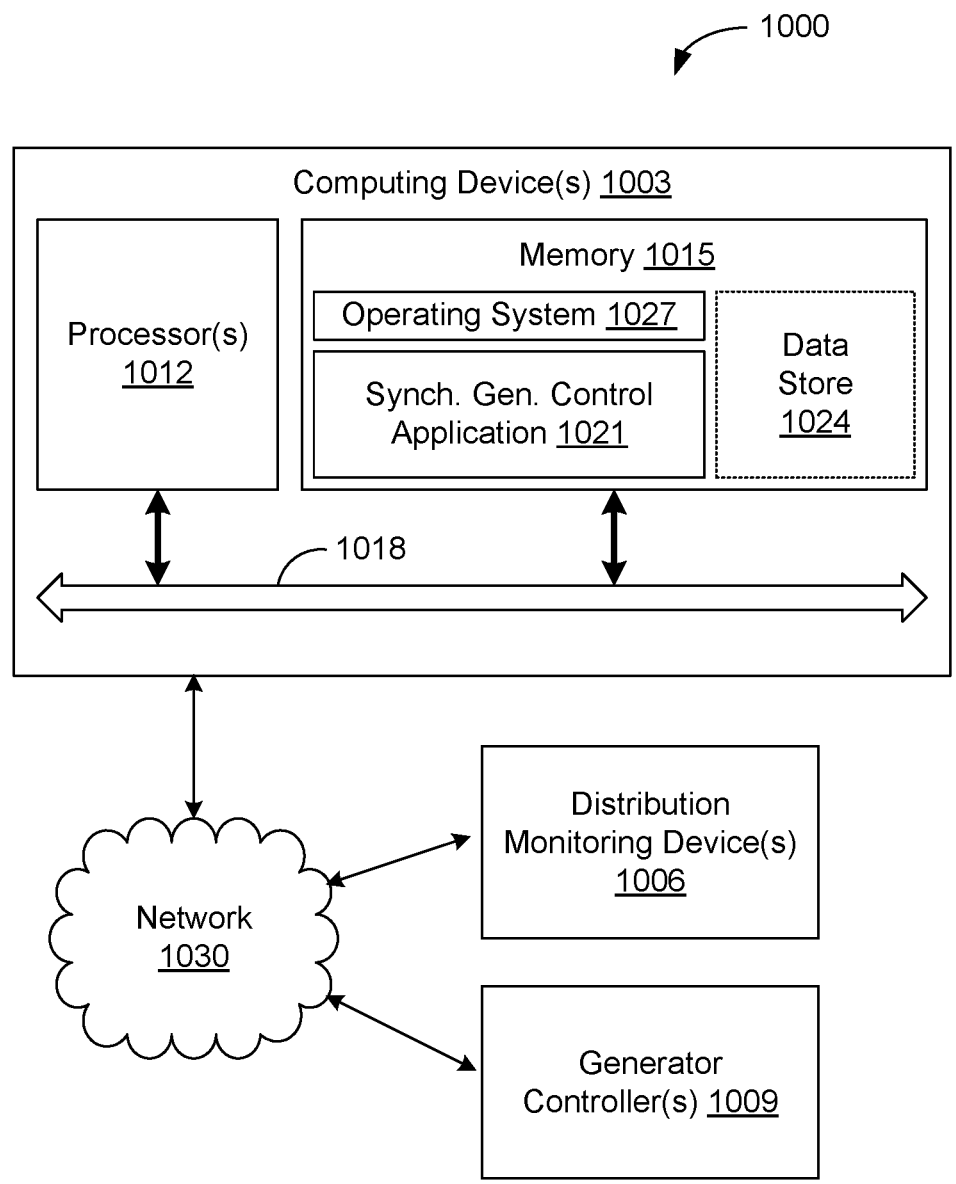
FIG. 16 is an example of a system that may be utilized in power distribution analysis and control according to various embodiments of the present disclosure.

Referring now to FIG. 16, shown is an example of a system 1000 that may be utilized in the monitoring and control of power systems. The system 1000 includes one or more computing device(s) 1003, one or more distribution monitoring device(s) 1006 (e.g., a PMU) that can be distributed about a power distribution network to provide indications of operational conditions in the power distribution network, and one or more generator controller(s) 1009 associated with generators distributed throughout the power distribution network. For example, the distribution monitoring device(s) 1006 can monitor electrical power distribution by monitoring conditions of components of the distribution network such as generators and/or distribution buses. Monitored conditions can include voltage levels, current flows, frequencies, operating speeds, and/or other conditions of the various system components. The generator controller(s) 1009 can control the operation of the corresponding generator(s) (FIG. 2) based upon signals received from the computing device 1003. For example, the computing device can communicate estimated parameters of the synchronous generator model of FIG. 1 to the generator controller 1009 for updating and use in control of the corresponding generator.

The computing device 1003 includes at least one processor circuit, for example, having a processor 1012 and a memory 1015, both of which are coupled to a local interface 1018. To this end, the computing device(s) 1003 may comprise, for example, a server computer or any other system providing computing capability. The computing device(s) 1003 may include, for example, one or more display devices such as cathode ray tubes (CRTs), liquid crystal display (LCD) screens, gas plasma-based flat panel displays, LCD projectors, or other types of display devices, etc. The computing device(s) 1003 may also include, for example various peripheral devices. In particular, the peripheral devices may include input devices such as, for example, a keyboard, keypad, touch pad, touch screen, microphone, scanner, mouse, joystick, or one or more push buttons, etc. Even though the computing device 1003 is referred to in the singular, it is understood that a plurality of computing devices 1003 may be employed in the various arrangements as described above. The local interface 1018 may comprise, for example, a data bus with an accompanying address/control bus or other bus structure as can be appreciated.

Stored in the memory 1015 are both data and several components that are executable by the processor 1012. In particular, stored in the memory 1015 and executable by the processor 1012 include a synchronous generator control application 1021 and potentially other applications. Also stored in the memory 1015 may be a data store 1024 and other data. The data stored in the data store 1024, for example, is associated with the operation of the various applications and/or functional entities described below. For example, the data store may include PMU data, sample analysis results, parameter estimations, and other data or information as can be understood. In addition, an operating system 1027 may be stored in the memory 1015 and executable by the processor 1012. The data store 1024 may be may be located in a single computing device or may be dispersed among many different devices.

The distribution monitoring device 1006 is representative of a plurality of devices such as, e.g., PMUs that may be communicatively coupled to the computing device 1003 through a network 1030 such as, e.g., the Internet, intranets, extranets, wide area networks (WANs), local area networks (LANs), wired networks, wireless networks, networks configured for communication over a power grid, or other suitable networks, etc., or any combination of two or more such networks. The distribution monitoring device 1006 may comprise, for example, a processor-based system such as a computer system or other application specific monitoring system with communication capabilities. In some embodiments, a distribution monitoring device 1006 may be directly connected to the computing device 1003.

The components executed on the computing device 1003 include, for example, the synchronous generator control application 1018 and other systems, applications, services, processes, engines, or functionality not discussed in detail herein. The computing device 1003 can receive information regarding the monitored system from a distribution monitoring device 1006, which can then be evaluated by the synchronous generator control application 1021. The computing device 1003 may also receive stored information regarding a power distribution network for modeling and evaluation of the generator with frequency control.

It is understood that there may be other applications that are stored in the memory 1015 and are executable by the processor 1012 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 1015 and are executable by the processor 1012. In this respect, the term "executable" means a program file that is in a form that can ultimately be run by the processor 1012. Examples of executable programs may be, for example, a compiled program that can be translated into machine instructions in a format that can be loaded into a random access portion of the memory 1015 and run by the processor 1012, source code that may be expressed in proper format such as object code that is capable of being loaded into a random access portion of the memory 1015 and executed by the processor 1012, or source code that may be interpreted by another executable program to generate instructions in a random access portion of the memory 1015 to be executed by the processor 1012, etc. An executable program may be stored in any portion or component of the memory 1015 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 1012 may represent multiple processors 1012 and the memory 1015 may represent multiple memories 1015 that operate in parallel processing circuits, respectively. In such a case, the local interface 1018 may be an appropriate network that facilitates communication between any two of the multiple processors 1012, between any processor 1012 and any of the memories 1015, or between any two of the memories 1015, etc. The local interface 1018 may comprise additional systems designed to coordinate this communication, including, for example, performing load balancing. The processor 1012 may be of electrical or of some other available construction.

Although the synchronous generator control application 1021, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the synchronous generator control application 1021, that comprises software or instructions can be embodied in any non-transitory computer-readable medium for use by or in connection with an instruction execution system such as, for example, a processor 1012 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

A synchronous generator control application 1021 utilizing UKF was implemented to estimate dynamic states and parameters of a low-order synchronous generator model with both primary and secondary frequency control systems. The UKF method uses voltage magnitude and active power measurements as inputs, and voltage angle, reactive power and frequency as outputs. Inertia constant, damping coefficient, turbine-governor time constant, droop regulation, and secondary frequency control gain were all estimated. Both simulation data and real-world PMU data were used for case studies. In this disclosure, various techniques were presented to improve the UKF algorithm for this application. The techniques include: (i) parameter conversion to increase parameter detection sensitivity from the measurements; and (ii) measurement interpolation to have a higher sampling rate to improve UKF convergence. In the validation step, a low-order dynamic simulation model was constructed with the estimated parameters. Input data were fed into the model to generate output data that was then compared with measurements of the outputs.

The case studies demonstrate the feasibility of the disclosed UKF estimation approach for system identification using PMU data. Through the disclosed estimation method, a complex generator model can be emulated using a low-order generator with frequency controls. The case study on the real-world PMU data demonstrates the capability of the disclosed UKF on identifying an equivalent generator model.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
   obtaining, by a computing device, operational parameters associated with a generator of a power system;
   determining, by the computing device, parameters of a synchronous generator model with frequency control based at least in part upon the operational parameters associated with the generator, where the determined parameters of the synchronous generator model are determined using unscented Kalman filtering; and
   providing, by the computing device, a command to a frequency control of the generator, the command updating one or more parameters of the frequency control based upon the determined parameters of the synchronous generator model.

2. The method of claim 1, wherein the synchronous generator model with frequency control comprises a primary frequency control loop and a secondary frequency control loop.

3. The method of claim 2, wherein the primary frequency control loop comprises a droop control and the secondary frequency control loop comprises an integrator gain ($K_i$) that adjusts reference power to maintain generator frequency at a nominal value.

4. The method of claim 3, wherein the determined parameters of the synchronous generator model comprise the integrator gain ($K_i$).

5. The method of claim 3, wherein the determined parameters of the synchronous generator model comprise droop regulation (R) of the droop control.

6. The method of claim 1, wherein the operational parameters are measured by a phasor measurement unit (PMU) associated with the generator.

7. The method of claim 6, wherein the PMU measures the operational parameters at a distribution bus associated with the generator.

8. The method of claim 6, wherein the operational parameters comprise voltage magnitude ($V_g$) and active power ($P_g$).

9. The method of claim 8, wherein the operational parameters further comprise voltage phase angle ($\theta$), reactive power ($Q_g$), and frequency (f).

10. A system, comprising:
    a generator controller for a generator of a power system; and
    a computing device in communication with the generator controller, the computing device comprising a processor and memory storing a synchronous generator control application, where execution of the synchronous generator control application causes the computing device to:

determine parameters of a synchronous generator model with frequency control based at least in part upon the operational parameters associated with the generator, where the determined parameters of the synchronous generator model are determined using unscented Kalman filtering; and provide a command to the generator controller, the command updating one or more parameters of a frequency control of the generator controller based upon the determined parameters of the synchronous generator model.

11. The system of claim 10, wherein the operational parameters are received by the computing device from one or more distribution monitoring device associated with the generator.

12. The system of claim 11, wherein the one or more distribution monitoring device is in communication with the computing device via a network.

13. The system of claim 10, wherein the one or more distribution monitoring device comprises a phasor measurement unit (PMU) that measures at least a portion of the operational parameters at a distribution bus associated with the generator.

14. The system of claim 10, wherein the operational parameters comprise voltage magnitude ($V_g$) and active power ($P_g$) of the generator.

15. The system of claim 14, wherein the operational parameters further comprise voltage phase angle ($\theta$), reactive power ($Q_g$), and frequency (f) of the generator.

16. The system of claim 10, wherein the synchronous generator model with frequency control comprises a primary frequency control loop and a secondary frequency control loop.

17. The system of claim 16, wherein the primary frequency control loop comprises a droop control and the secondary frequency control loop comprises an integrator gain ($K_i$) that adjusts reference power to maintain generator frequency at a nominal value.

18. The system of claim 17, wherein the determined parameters of the synchronous generator model comprise droop regulation (R) of the droop control.

* * * * *